United States Patent
Shete et al.

(10) Patent No.: US 12,540,213 B2
(45) Date of Patent: Feb. 3, 2026

(54) COMPOSITION AND FOAMED POLYURETHANE ARTICLE FORMED THEREWITH

(71) Applicants: DOW SILICONES CORPORATION, Midland, MI (US); DOW GLOBAL TECHNOLOGIES LLC, Midland, MI (US)

(72) Inventors: Abhishek Shete, Lake Jackson, TX (US); Kaoru Aou, Lake Jackson, TX (US); Dakai Ren, Lake Jackson, TX (US); William A. Koonce, Lake Jackson, TX (US); Adam L. Grzesiak, Midland, MI (US); James Young, Jr., Midland, MI (US); Sachit Goyal, Lake Jackson, TX (US)

(73) Assignees: DOW SILICONES CORPORATION, Midland, MI (US); DOW GLOBAL TECHNOLOGIES LLC, Midland, MI (US)

(*) Notice: Subject to any disclaimer, the term of this patent is extended or adjusted under 35 U.S.C. 154(b) by 624 days.

(21) Appl. No.: 17/925,968

(22) PCT Filed: May 21, 2021

(86) PCT No.: PCT/US2021/033620
§ 371 (c)(1),
(2) Date: Nov. 17, 2022

(87) PCT Pub. No.: WO2021/237069
PCT Pub. Date: Nov. 25, 2021

(65) Prior Publication Data
US 2023/0250216 A1  Aug. 10, 2023

Related U.S. Application Data

(60) Provisional application No. 63/048,628, filed on Jul. 6, 2020, provisional application No. 63/028,638, filed on May 22, 2020.

(51) Int. Cl.
| | |
|---|---|
| *C08G 18/61* | (2006.01) |
| *C08G 18/40* | (2006.01) |
| *C08G 18/48* | (2006.01) |
| *C08G 18/76* | (2006.01) |
| *C08J 9/12* | (2006.01) |
| *C09D 5/02* | (2006.01) |
| *C09D 175/08* | (2006.01) |
| *H01M 10/658* | (2014.01) |
| *H01M 50/16* | (2021.01) |

(52) U.S. Cl.
CPC ......... *C08G 18/61* (2013.01); *C08G 18/4009* (2013.01); *C08G 18/4825* (2013.01); *C08G 18/4829* (2013.01); *C08G 18/7671* (2013.01); *C08J 9/125* (2013.01); *C09D 5/021* (2013.01); *C09D 175/08* (2013.01); *H01M 10/658* (2015.04); *H01M 50/16* (2021.01); *C08G 2110/0058* (2021.01); *C08G 2110/0066* (2021.01); *C08G 2110/0083* (2021.01); *C08G 2150/60* (2013.01); *C08J 2203/10* (2013.01); *C08J 2205/052* (2013.01); *C08J 2375/08* (2013.01)

(58) Field of Classification Search
CPC .............................. C08G 18/61; C08G 18/615
See application file for complete search history.

(56) References Cited

U.S. PATENT DOCUMENTS

| | | | |
|---|---|---|---|
| 3,080,329 A * | 3/1963 | Barringer ........... | C08G 18/4205 521/131 |
| 4,692,476 A | 9/1987 | Simpson | |
| 8,541,126 B2 | 9/2013 | Hermann et al. | |
| 10,501,597 B2 | 12/2019 | O'Neil et al. | |
| 2005/0131088 A1 | 6/2005 | Stanjek et al. | |
| 2007/0093618 A1* | 4/2007 | Cheng .................... | C08G 77/16 525/452 |

(Continued)

FOREIGN PATENT DOCUMENTS

| | | |
|---|---|---|
| CN | 104277197 A | 1/2015 |
| CN | 105504205 A | 4/2016 |

(Continued)

OTHER PUBLICATIONS

Desmodur N-3390 safety data sheet, Apr. 16, 2024. (Year: 2024).*

(Continued)

*Primary Examiner* — Christopher M Rodd
(74) *Attorney, Agent, or Firm* — Warner Norcross + Judd LLP

(57) ABSTRACT

A composition for preparing a foamed polyurethane article is disclosed. The composition comprises (1) an isocyanate-reactive component and (2) an isocyanate component. The (1) isocyanate-reactive component comprises (A) an organopolysiloxane having an average of at least two carbinol functional groups per molecule and (B) a polyol. The (A) organopolysiloxane is present in an amount of from >10 to <99 wt. % based on the combined weight of the (A) organopolysiloxane and the (B) polyol. The (2) isocyanate component comprises (C) a polyisocyanate. The composition further comprises (D) a blowing agent, and (E) a catalyst. A foamed polyurethane article comprising the reaction product of the composition is also disclosed, along with use of the foamed polyurethane article.

14 Claims, No Drawings

(56) References Cited

U.S. PATENT DOCUMENTS

| | | | |
|---|---|---|---|
| 2007/0259258 A1* | 11/2007 | Buck ................ | H01M 10/0481 429/120 |
| 2012/0003508 A1 | 1/2012 | Narbonne et al. | |
| 2019/0259982 A1 | 8/2019 | Goirgini | |
| 2020/0231739 A1 | 7/2020 | Jaehnigen et al. | |

FOREIGN PATENT DOCUMENTS

| DE | 3445026 A1 | 6/1985 |
|---|---|---|
| JP | 2013052491 A | 3/2013 |
| JP | 6175851 B2 | 8/2017 |
| JP | 2020035640 A | 3/2020 |
| WO | 200107499 A1 | 2/2001 |
| WO | 2003080696 A1 | 10/2003 |
| WO | 2005037887 A1 | 4/2005 |
| WO | 2019161292 A1 | 8/2019 |

OTHER PUBLICATIONS

International Search Report for PCT/US2021/033620 dated Aug. 16, 2021, 4 pages.
Machine assisted English translation of DE3445026A1 obtained from https://patents.google.com/patent on Nov. 16, 2022, 6 pages.
Machine assisted English translation of CN105504205A obtained from https://patents.google.com/patent on Nov. 17, 2022, 6 pages.
Machine assisted English translation of CN104277197A obtained from https://patents.google.com/patent on Nov. 17, 2022, 10 pages.
Machine assisted English translation of JP6175851B2 obtained from https://patents.google.com/patent on Nov. 17, 2022, 15 pages.
Neuman, Stephen, "The GlueTalk Blog: Safer Battery, Lighter Battery Pack and Greener Future", H.B. Fuller, Mar. 20, 2018, 3 pages (obtained on Nov. 16, 2022 from: https://www.hbfuller.com/en/north-america/news-and-events/glue-talk-blog/2018/march/safer-battery-lighter-battery-pack-and-greener-future).

* cited by examiner

COMPOSITION AND FOAMED POLYURETHANE ARTICLE FORMED THEREWITH

CROSS-REFERENCE TO RELATED APPLICATIONS

This application is the U.S. National Stage of International Application No. PCT/US2021/033620 filed on 21 May 2021, which claims priority to and all advantages of U.S. Provisional Patent Application No. 63/028,638 filed on 22 May 2020 and U.S. Provisional Patent Application No. 63/048,628 filed on 6 Jul. 2020, the contents of which are incorporated herein by reference.

TECHNICAL FIELD

The subject disclosure generally relates to a composition and, more specifically, to an isocyanate-reactive composition, a composition comprising the isocyanate-reactive composition for preparing a foamed polyurethane article, and related methods.

BACKGROUND

Foams are known in the art and utilized in various end use applications, including cushions, support articles, encapsulants/pottants, and insulation. Foams can be formed from various chemical compositions, and may utilize physical and/or chemical blowing agents. For example, polyurethane foams are generally formed from reacting an isocyanate and a polyol in the presence of a blowing agent. Foams can also be formed from or with silicone compositions. Performance properties of foams, including hardness, density, flexibility, etc., are a function of the composition utilized in their preparation. For example, unlike with polyurethane foams, reducing density of a silicone foam generally results in a significant reduction of hardness due to lack of hard segments. In addition, reducing density of silicone foams also results in reduced tear strength. These impacts to performance properties can be undesirable, particularly when certain performance characteristics of silicone foams are desired along with reduced density. For example, reduced density, and weight, is of particular importance in the transportation and automotive industries, where lightweighting improves efficiency and handling.

BRIEF SUMMARY

An isocyanate-reactive composition is disclosed, which comprises (A) an organopolysiloxane having an average of at least two carbinol functional groups per molecule and (B) a polyol. The (A) organopolysiloxane is present in an amount of from >10 to <99 wt. % based on the combined weight of the (A) organopolysiloxane and the (B) polyol.

A composition for preparing a foamed polyurethane article is also disclosed. The composition comprises (1) an isocyanate-reactive component, the isocyanate-reactive component being the isocyanate-reactive composition, and (2) an isocyanate component. The (2) isocyanate component comprises (C) a polyisocyanate. The composition further comprises (D) a blowing agent and (E) a catalyst. Components (D) and (E) may independently be present in the (1) isocyanate-reactive component, the (2) isocyanate component, or separate from the (1) isocyanate-reactive component and the (2) isocyanate component.

A foamed polyurethane article comprising the reaction product of the composition is also disclosed, along with use of the foamed polyurethane article as an encapsulant, a pottant, a thermal barrier, and/or in automotive applications.

Further still, a method of preparing a composite article with the composition is disclosed. The method comprises disposing a composition on a substrate, and curing the composition to give a foamed polyurethane article on the substrate and prepare the composite article. The composite article formed in accordance with this method is additionally disclosed.

DETAILED DESCRIPTION OF THE INVENTION

An isocyanate-reactive composition, and a composition comprising the same for preparing a foamed polyurethane article is disclosed. The foamed polyurethane article, which is the reaction product of the composition, is suitable for diverse end use applications, including those involving conventional foamed polyurethanes and/or conventional foamed silicone elastomers. For example, the foamed polyurethane article can be utilized as an encapsulant, a pottant, or a thermal barrier. The foamed polyurethane article has excellent properties for use in automotive applications, as described below. However, end use applications of the foamed polyurethane article are not so limited.

The composition comprises (1) an isocyanate-reactive component and an (2) an isocyanate component, which are each described below. The (1) isocyanate-reactive component is also provided by this disclosure, and may be referred to as an isocyanate-reactive composition when separate from the composition comprising the (1) isocyanate-reactive component and the (2) isocyanate component. All reference and disclosure relating to the (1) isocyanate-reactive component also applies to the isocyanate-reactive composition.

The (1) isocyanate-reactive component comprises (A) an organopolysiloxane having an average of at least two carbinol functional groups per molecule. The carbinol functional groups can be the same as or different from one another. Carbinol functional groups on organopolysiloxanes are distinguished from silanol groups, where carbinol functional groups include a carbon-bonded hydroxyl group, and silanol functional groups include a silicon-bonded hydroxyl group. Said differently, carbinol functional groups are of formula -COH, whereas silanol functional groups are of formula —SiOH. These functional groups perform differently; for example, silanol functional groups can readily condense to give siloxane (—Si—O—Si—) bonds, which generally does not occur with carbinol functional groups (at least under the same catalysis of hydrolysis of silanol functional groups).

In certain embodiments, the carbinol functional groups independently have the general formula -D-O$_a$—(C$_b$H$_{2b}$O)$_c$—H, where D is a covalent bond or a divalent hydrocarbon linking group having from 2 to 18 carbon atoms, subscript a is 0 or 1, subscript b is independently selected from 2 to 4 in each moiety indicated by subscript c, and subscript c is from 0 to 500, with the proviso that subscripts a and c are not simultaneously 0.

In one embodiment, subscript c is at least one such that at least one of the carbinol functional groups has the general formula:

—D—O$_a$—[C$_2$H$_4$O]$_x$[C$_3$H$_6$O]$_y$[C$_4$H$_8$O]$_z$—H;

where D is a covalent bond or a divalent hydrocarbon linking group having from 2 to 18 carbon atoms, subscript a is 0 or 1, 0≤x≤500, 0≤y≤500, and 0≤z≤500, with the proviso that 1≤x+y+z≤500. In these embodiments, the carbinol functional group may alternatively be referred to as a polyether group or moiety, although the polyether group or moiety terminates with —COH, rather than —COR$^O$, where R$^O$ is a monovalent hydrocarbon group. As understood in the art, moieties indicated by subscript x are ethylene oxide (EO) units, moieties indicated by subscript y are propylene oxide (PO) units, and moieties indicated by subscript z are butylene oxide (BO) units. The EO, PO, and BO units, if present, may be in block or randomized form in the polyether group or moiety. The relative amounts of EO, PO, and BO units, if present, can be selectively controlled based on desired properties of the (A) organopolysiloxane, composition, and resulting foamed polyurethane article. For example, the molar ratios of such alkylene oxide units can influence hydrophilicity and other properties.

In another embodiment, subscript c is 0 and subscript a is 1 such that at least one of the carbinol functional groups has the general formula: -D-OH, where D is described above. In these embodiments, the carbinol functional groups having this general formula are not polyether groups or moieties.

Regardless of the independent selection of the carbinol functional groups of component (A), component (A) is typically substantially linear. By substantially linear, it is meant that component (A) comprises, consists essentially of, or consists of only M and D siloxy units. As readily understood in the art, M siloxy units are of formula [R$_3$SiO$_{1/2}$] and D siloxy units are of formula [R$_2$SiO$_{2/2}$]. Traditionally, M and D siloxy nomenclature is utilized in connection with only methyl substitution. However, for purposes of this disclosure, in the M and D siloxy units above, R is independently selected from substituted or unsubstituted hydrocarbyl groups or carbinol functional groups, with the proviso that at least two of R are independently selected carbinol functional groups. When an M siloxy unit includes at least one carbinol functional group, the carbinol functional group is terminal. When a D siloxy unit includes at least one carbinol functional group, the carbinol functional group is pendent. The substantially linear organopolysiloxane may have the average formula: R$_{a'}$SiO$_{(4-a')/2}$, where each R is independently selected and defined above, including the proviso that at least two of R are independently selected carbinol functional groups, and where subscript a' is selected such that 1.9≤a'≤2.2.

In general, hydrocarbyl groups suitable for R may independently be linear, branched, cyclic, or combinations thereof. Cyclic hydrocarbyl groups encompass aryl groups as well as saturated or non-conjugated cyclic groups. Cyclic hydrocarbyl groups may independently be monocyclic or polycyclic. Linear and branched hydrocarbyl groups may independently be saturated or unsaturated. One example of a combination of a linear and cyclic hydrocarbyl group is an aralkyl group. General examples of hydrocarbyl groups include alkyl groups, aryl groups, alkenyl groups, halocarbon groups, and the like, as well as derivatives, modifications, and combinations thereof. Examples of suitable alkyl groups include methyl, ethyl, propyl (e.g. iso-propyl and/or n-propyl), butyl (e.g. isobutyl, n-butyl, tert-butyl, and/or sec-butyl), pentyl (e.g. isopentyl, neopentyl, and/or tert-pentyl), hexyl, hexadecyl, octadecyl, as well as branched saturated hydrocarbon groups having from 6 to 18 carbon atoms. Examples of suitable non-conjugated cyclic groups include cyclobutyl, cyclohexyl, and cycyloheptyl groups. Examples of suitable aryl groups include phenyl, tolyl, xylyl, naphthyl, benzyl, and dimethyl phenyl. Examples of suitable alkenyl groups include vinyl, allyl, propenyl, isopropenyl, butenyl, isobutenyl, pentenyl, heptenyl, hexenyl, hexadecenyl, octadecenyl and cyclohexenyl groups. Examples of suitable monovalent halogenated hydrocarbon groups (i.e., halocarbon groups, or substituted hydrocarbon groups) include halogenated alkyl groups, aryl groups, and combinations thereof. Examples of halogenated alkyl groups include the alkyl groups described above where one or more hydrogen atoms is replaced with a halogen atom such as F or Cl. Specific examples of halogenated alkyl groups include fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl groups, as well as derivatives thereof. Examples of halogenated aryl groups include the aryl groups described above where one or more hydrogen atoms is replaced with a halogen atom, such as F or Cl. Specific examples of halogenated aryl groups include chlorobenzyl and fluorobenzyl groups.

In specific embodiments, each R that is not a carbinol functional group is independently selected from alkyl groups having from 1 to 32, alternatively from 1 to 28, alternatively from 1 to 24, alternatively from 1 to 20, alternatively from 1 to 16, alternatively from 1 to 12, alternatively from 1 to 8, alternatively from 1 to 4, alternatively 1, carbon atoms.

The (A) organopolysiloxane may include at least some branching attributable to the presence of T or Q siloxy units. As understood in the art, T units are of formula [RSiO$_{3/2}$] and Q siloxy units are of formula [SiO$_{4/2}$], where R is defined above. However, the (A) organopolysiloxane is typically free from such T and Q siloxy units. By "at least some," it is meant that the (A) organopolysiloxane may include up to 5, alternatively up to 4, alternatively up to 3, alternatively up to 2, alternatively up to 1, alternatively 0, mol % T and Q siloxy units based on all siloxy units present in the (A) organopolysiloxane. If such branching is present in the (A) organopolysiloxane, it is typically attributable to T siloxy units rather than Q siloxy units. Typically, in view of desired viscosities, the (A) organopolysiloxane is a flowable liquid at room temperature, including in the absence of any solvent or carrier vehicle, rather than a gum or resin. While gums or resins can be liquid at room temperature when present in a solvent or carrier vehicle, such solvents can be undesirable in certain end use applications, as solvents are typically volatilized or otherwise removed during the curing process.

In specific embodiments where component (A) is linear, component (A) may have the general formula:

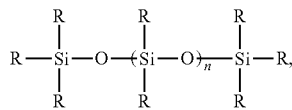

where each R is an independently selected and defined above, including the proviso that at least two of R independently comprise a carbinol functional group, and subscript n is from 0 to 100. Subscript n may alternatively be referred to as the degree of polymerization (DP) of component (A). Typically, DP is inversely proportional to viscosity, all else (e.g. substituents and branching) being equal. Subscript n is alternatively from greater than 0 to 95, alternatively from greater than 0 to 90, alternatively from greater than 0 to 85, alternatively from greater than 0 to 80, alternatively from greater than 0 to 75, alternatively from greater than 0 to 70, alternatively from greater than 0 to 65. Alternatively, subscript n is from 5 to 70, alternatively from 10 to 65. In one specific embodiment, subscript n is from 10 to 20. In an alternative specific embodiment, subscript n is from 28 to 32, alternatively from 29 to 31, alternatively 30. In an alternative specific embodiment, subscript n is from 48 to 52, alternatively from 49 to 51, alternatively 50. In an alternative specific embodiment, subscript n is from 58 to 62, alternatively from 59 to 61, alternatively 60.

In specific embodiments, each carbinol functional group has formula -D-OH, and the (A) organopolysiloxane has the following general formula:

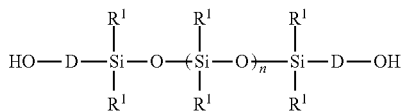

where D and subscript n are defined above, and where each $R^1$ is an independently selected substituted or unsubstituted hydrocarbyl group, as set forth above for R. In these embodiments, the carbinol functional groups are terminal in component (A). These carbinol functional groups may be the same as or different from one another based on D. This formula can alternatively be written as $[(OHD-)R^1{}_2 SiO_{1/2}]_2[Si^1{}_2O_{2/2}]_n$.

In other embodiments, each carbinol functional group has the general formula $-D-O_a-(C_bH_{2b}O)_c-H$, where D and subscripts a-c are defined above, and the carbinol functional groups are pendent, such that the (A) organopolysiloxane has the following general formula:

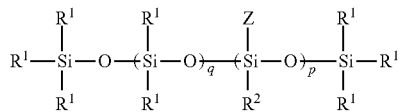

where each $R^1$ is independently selected and defined above, each subscript Z is $-D-O_a-(C_bH_{2b}O)_c-H$, where D and subscripts a-c are defined above, each subscript $R^2$ is independently selected from $R^1$ and Z, and subscripts p and q are each from 1 to 99, with the proviso that p+q≤100. In the general formula above, the siloxy units indicated by subscripts q and p may be randomized or in block form. The general formula above is intended to be a representation of the average unit formula of component (A) in this embodiment based on the number of $R^1{}_2SiO_{2/2}$ units indicated by subscript q and $R^2ZSiO_{2/2}$ units indicated by subscript p without requiring a particular order thereof. Thus, this general formula may be written alternatively as $[(R^1)_3 SiO_{1/2}]_2[(R^1)_2SiO_{2/2}]_q[(R^1)ZSiO_{2/2}]_p$, where subscripts q and p are defined above. In these embodiments, the carbinol functional groups are polyether groups, and the polyether groups are pendent in component (A). When each $R^1$ is methyl, this embodiment of component (A) is trimethylsiloxy endblocked, and includes dimethylsiloxy units (indicated by subscript q).

While specific structures of component (A) are exemplified above, component (A) can include terminal polyether groups as the carbinol functional group, or pendent carbinol functional groups that are not polyether groups, or any combination of independently selected carbinol functional groups.

D is typically a function of preparing the (A) organopolysiloxane. For example, the (A) organopolysiloxane may be formed by a hydrosilylation-reaction between an organohydrogenpolysiloxane and an unsaturated carbinol compound. In such embodiments, the organohydrogenpolysiloxane includes silicon-bonded hydrogen atoms at locations (e.g. terminal and/or pendent) where carbinol functionality is desired. The unsaturated carbinol compound may have formula $Y-O_a-(C_bH_{2b}O)_c-H$, where Y is an ethylenically unsaturated group, and subscripts a, b, and c are as defined above.

In the hydrosilylation-reaction above, the ethylenically unsaturated group represented by Y can be an alkenyl and/or alkynyl group having from 2 to 18, alternatively from 2 to 16, alternatively from 2 to 14, alternatively from 2 to 12, alternatively from 2 to 8, alternatively from 2 to 4, alternatively 2, carbon atoms. "Alkenyl" means an acyclic, branched or unbranched, monovalent hydrocarbon group having one or more carbon-carbon double bonds. Specific examples thereof include vinyl groups, allyl groups, hexenyl groups, and octenyl groups. "Alkynyl" means an acyclic, branched or unbranched, monovalent hydrocarbon group having one or more carbon-carbon triple bonds. Specific examples thereof include ethynyl, propynyl, and butynyl groups. Various examples of ethylenically unsaturated groups include $CH_2=CH-$, $CH_2=CHCH_2-$, $CH_2=CH(CH_2)_4-$, $CH_2=CH(CH_2)_6-$, $CH_2=C(CH_3)CH_2-$, $H_2C=C(CH_3)-$, $H_2C=C(CH_3)-$, $H_2C=C(CH_3)CH_2-$, $H_2C=CHCH_2CH_2-$, $H_2C=CHCH_2CH_2CH_2-$, $HC\equiv C-$, $HC\equiv CCH_2-$, $HC\equiv CCH(CH_3)-$, $HC\equiv CC(CH_3)_2-$, and $HC\equiv CC(CH_3)_2CH_2-$. Typically, ethylenic unsaturation is terminal in Y. As understood in the art, ethylenic unsaturation may be referred to as aliphatic unsaturation. Thus, when D is $-CH_2CH_2-$, for example, the unsaturated carbinol compound can have formula $CH_2=CH-O_a-(C_bH_{2b}O)_c-H$. The number of carbon atoms in D is a function of the number of carbon atoms in the ethylenically unsaturated group, which remains constant even after the hydrosilylation-reaction to prepare component (A).

In certain embodiments, the hydrosilylation-reaction catalyst utilized to form component (A) comprises a Group VIII to Group XI transition metal. Reference to Group VIII to Group XI transition metals is based on the modern IUPAC nomenclature. Group VIII transition metals are iron (Fe), ruthenium (Ru), osmium (Os), and hassium (Hs); Group IX transition metals are cobalt (Co), rhodium (Rh), and iridium (Ir); Group X transition metals are nickel (Ni), palladium (Pd), and platinum (Pt); and Group XI transition metals are copper (Cu), silver (Ag), and gold (Au). Combinations thereof, complexes thereof (e.g. organometallic complexes), and other forms of such metals may be utilized as the hydrosilylation-reaction catalyst.

Additional examples of catalysts suitable for the hydrosilylation-reaction catalyst include rhenium (Re), molybdenum (Mo), Group IV transition metals (i.e., titanium (Ti), zirconium (Zr), and/or hafnium (Hf)), lanthanides, actinides, and Group I and II metal complexes (e.g. those comprising calcium (Ca), potassium (K), strontium (Sr), etc.). Combinations thereof, complexes thereof (e.g. organometallic complexes), and other forms of such metals may be utilized as the hydrosilylation-reaction catalyst.

The hydrosilylation-reaction catalyst may be in any suitable form. For example, the hydrosilylation-reaction catalyst may be a solid, examples of which include platinum-based catalysts, palladium-based catalysts, and similar noble metal-based catalysts, and also nickel-based catalysts. Specific examples thereof include nickel, palladium, platinum, rhodium, cobalt, and similar elements, and also platinum-palladium, nickel-copper-chromium, nickel-copper-zinc, nickel-tungsten, nickel-molybdenum, and similar catalysts comprising combinations of a plurality of metals. Additional examples of solid catalysts include Cu—Cr, Cu—Zn, Cu—Si, Cu—Fe—Al, Cu—Zn—Ti, and similar copper-containing catalysts, and the like.

The hydrosilylation-reaction catalyst may be in or on a solid carrier. Examples of carriers include activated carbons, silicas, silica aluminas, aluminas, zeolites and other inorganic powders/particles (e.g. sodium sulphate), and the like. The hydrosilylation-reaction catalyst may also be disposed in a vehicle, e.g. a solvent which solubilizes the hydrosilylation-reaction catalyst, alternatively a vehicle which merely carries, but does not solubilize, the hydrosilylation-reaction catalyst. Such vehicles are known in the art.

In specific embodiments, the hydrosilylation-reaction catalyst comprises platinum. In these embodiments, the hydrosilylation-reaction catalyst is exemplified by, for example, platinum black, compounds such as chloroplatinic acid, chloroplatinic acid hexahydrate, a reaction product of chloroplatinic acid and a monohydric alcohol, platinum bis(ethylacetoacetate), platinum bis(acetylacetonate), platinum chloride, and complexes of such compounds with olefins or organopolysiloxanes, as well as platinum compounds microencapsulated in a matrix or core-shell type compounds. Microencapsulated hydrosilylation catalysts and methods of their preparation are also known in the art.

Complexes of platinum with organopolysiloxanes suitable for use as the hydrosilylation-reaction catalyst include 1,3-diethenyl-1,1,3,3-tetramethyldisiloxane complexes with platinum. These complexes may be microencapsulated in a resin matrix. Alternatively, the hydrosilylation-reaction catalyst may comprise 1,3-diethenyl-1,1,3,3-tetramethyldisiloxane complex with platinum. The hydrosilylation-reaction catalyst may be prepared by a method comprising reacting chloroplatinic acid with an aliphatically unsaturated organosilicon compound such as divinyltetramethyldisiloxane, or alkene-platinum-silyl complexes. Alkene-platinum-silyl complexes may be prepared, for example by mixing 0.015 mole $(COD)PtCl_2$ with 0.045 mole COD and 0.0612 moles $HMeSiCl_2$, where COD is cyclo-octadiene.

The hydrosilylation-reaction catalyst is utilized in the composition in a catalytic amount, i.e., an amount or quantity sufficient to promote curing thereof at desired conditions. The hydrosilylation-reaction catalyst can be a single hydrosilylation-reaction catalyst or a mixture comprising two or more different hydrosilylation-reaction catalysts.

Alternatively, D can be a covalent bond when component (A) is formed via a reaction other than hydrosilylation, e.g. a condensation reaction or a ring opening reaction.

In certain embodiments, component (A) has a capillary viscosity (kinematic viscosity via glass capillary) at 25° C. of from 1 to 1,000, alternatively from 1 to 900, alternatively from 10 to 700, alternatively from 10 to 600, mPa·s. Capillary viscosity can be measured in accordance with Dow Corning Corporate Test Method CTM0004 of 20 Jul. 1970. CTM0004 is known in the art and based on ASTM D445, IP 71. Typically, when component (A) has pendent polyether groups as the carbinol functional groups, component (A) has a higher viscosity than when component (A) includes terminal carbinol functional groups that are not polyether groups (as set forth in the exemplary structures above). For example, when component (A) includes pendent polyether groups, the capillary viscosity at 25° C. is typically from 200 to 900, alternatively from 300 to 800, alternatively from 400 to 700, alternatively from 500 to 600 mPa·s. In contrast, when component (A) includes only terminal carbinol functional groups which are not polyether groups, component (A) may have a capillary viscosity at 25° C. of from greater than 0 to 250, alternatively from greater than 0 to 100, alternatively from greater than 0 to 75, alternatively from 10 to 75, alternatively from 25 to 75, mPa·s.

In these or other embodiments, component (A) may have an OH equivalent weight of from 100 to 2,000, alternatively from 200 to 1,750, alternatively from 300 to 1,500, alternatively from 400 to 1,200 g/mol. Methods of determining OH equivalent weight are known in the art based on functionality and molecular weight.

The (1) isocyanate-reactive component further comprises (B) a polyol.

Polyether polyols suitable for the (1) isocyanate-reactive component include, but are not limited to, products obtained by the polymerization of a cyclic oxide, for example, ethylene oxide ("EO"), propylene oxide ("PO"), butylene oxide ("BO"), tetrahydrofuran, or epichlorohydrin, in the presence of polyfunctional initiators. Suitable initiators contain more than one, i.e., a plurality of, active hydrogen atoms. Catalysis for this polymerization can be either anionic or cationic, with suitable catalysts including KOH, CsOH, boron trifluoride, or a double metal cyanide complex (DMC) catalyst, such as zinc hexacyanocobaltate or a quaternary phosphazenium compound.

The initiator may be selected from, for example, neopentylglycol; 1,2-propylene glycol; water; trimethylolpropane; pentaerythritol; sorbitol; sucrose; glycerol; aminoalcohols, such as ethanolamine, diethanolamine, and tiethanolamine; alkanediols, such as 1,6-hexanediol, 1,4-butanediol, 1,3-butane diol, 2,3-butanediol, 1,3-propanediol, 1,2-propanediol, 1,5-pentanediol, 2-methylpropane-1,3-diol, 1,4-cyclohexane diol, 1,3-cyclohexanedimethanol, 1,4-cyclohexanedimethanol, 2,5-hexanediol; ethylene glycol; diethylene glycol; triethylene glycol; bis-3-aminopropyl methylamine; ethylene diamine; diethylene triamine; 9(1)-hydroxymethyloctadecanol, 1,4-bishydroxymethylcyclohexane; hydrogenated bisphenol; 9,9(10,10)-bishydroxymethyloctadecanol; 1,2,6-hexanetriol; and combinations thereof. Other initiators include other linear and cyclic compounds containing an amine group. Exemplary polyamine initiators include ethylene diamine; neopentyldiamine; 1,6-diaminohexane; bisaminomethyttricyclodecane; bisaminocyclohexane; diethylene triamine; bis-3-aminopropyl methylamine; triethylene tetramine; various isomers of toluene diamine; diphenylmethane diamine; N-methyl-1,2-ethanediamine, N-methyl-1,3-propanediamine; N,N-dimethyl-1,3-diaminopropane; N,N-dimethylethanolamine; 3,3'-diamino-N-methyldipropylamine; N,N-dimethyldipropylenetriamine; aminopropyl-imidazole; and combinations thereof. As understood in the art, the initiator compound, or combination thereof, is generally selected based on desired functionality of the resulting polyether polyol. For the purposes of this disclosure, the (B) polyol may be formed with any of the initiators mentioned above, or combinations of initiators. In addition, the (B) polyol may comprise any of these initiators, including glycerol.

Other suitable polyether polyols include polyether diols and triols, such as polyoxypropylene diols and triols and poly(oxyethylene-oxypropylene)diols and triols obtained by the simultaneous or sequential addition of ethylene and propylene oxides to di- or trifunctional initiators. Polyether polyols having higher functionalities than triols can also be utilize in lieu of or in addition to polyether diols and/or triols. Copolymers having an oxyethylene content of from 5 to 90% by weight, based on the weight of the copolymer, can be utilized. When the (B) polyol is a copolymer, the (B) polyol can be a block copolymer, a random/block copolymer, or a random copolymer. The (B) polyol can also be a terpolymer. Yet other suitable polyether polyols include polytetramethylene glycols obtained by the polymerization of tetrahydrofuran.

Polyester polyols suitable for the (1) isocyanate-reactive component include, but are not limited to, hydroxyl-functional reaction products of polyhydric alcohols (including mixtures thereof), such as ethylene glycol, propylene glycol, diethylene glycol, 1,4-butanediol, neopentylglycol, 1,6-hexanediol, cyclohexane dimethanol, glycerol, trimethylolpropane, pentaerythritol, sucrose, polyether polyols; and polycarboxylic acids, particularly dicarboxylic acids or their ester-forming derivatives, for example succinic, glutaric and adipic acids or their dimethyl esters, sebacic acid, phthalic anhydride, tetrachlorophthalic anhydride, dimethyl terephthalate or mixtures thereof. Polyester polyols obtained by the polymerization of lactones, e.g. caprolactone, in conjunction with a polyol, or of hydroxy carboxylic acids, e.g. hydroxy caproic acid, may also be used. In certain embodiments, the (B) polyol comprises a mixture of polyester and polyether polyols.

Suitable polyesteramide polyols may be obtained by the inclusion of aminoalcohols such as ethanolamine in polyesterification mixtures. Suitable polythioether polyols include products obtained by condensing thiodiglycol either alone or with other glycols, alkylene oxides, dicarboxylic acids, formaldehyde, aminoalcohols or aminocarboxylic acids. Suitable polycarbonate polyols include products obtained by reacting diols such as 1,3-propanediol, 1,4-butanediol, 1,6-hexanediol, diethylene glycol or tetraethylene glycol with diaryl carbonates, e.g. diphenyl carbonate, or with phosgene. Suitable polyacetal polyols include those prepared by reacting glycols such as diethylene glycol, triethylene glycol or hexanediol with formaldehyde. Other suitable polyacetal polyols may also be prepared by polymerizing cyclic acetals. Suitable polyolefin polyols include hydroxy-terminated butadiene homo- and copolymers and suitable polysiloxane polyols include polydimethylsiloxane diols and triols.

In certain embodiments, the (B) polyol is a polymer polyol. In specific embodiments, the polymer polyol is a graft polyol. Graft polyols may also be referred to as graft dispersion polyols or graft polymer polyols. Graft polyols often include products, i.e., polymeric particles, obtained by the in-situ polymerization of one or more vinyl monomers, e.g. styrene monomers and/or acrylonitrile monomers, and a macromer in a polyol, e.g. a polyether polyol.

In other embodiments, the polymer polyol is chosen from polyhamstoff (PHD) polyols, polyisocyanate polyaddition (PIPA) polyols, and combinations thereof. It is to be appreciated that the (1) isocyanate-reactive component can include any combination of the aforementioned polymer polyols. PHD polyols are typically formed by in-situ reaction of a diisocyanate with a diamine in a polyol to give a stable dispersion of polyurea particles. PIPA polyols are similar to PHD polyols, except that the dispersion is typically formed by in-situ reaction of a diisocyanate with an alkanolamine instead of a diamine, to give a polyurethane dispersion in a polyol.

It is to be appreciated that the (1) isocyanate-reactive component may include any combination of two or more polyols that are different from one another based on functionality, molecular weight, viscosity, or structure.

In various embodiments, the (B) polyol has a hydroxyl (OH) equivalent weight of from greater than 0 to 2,000, alternatively from greater than 0 to 1,700, alternatively from greater than 0 to 1,000, alternatively from greater than 0 to 700, alternatively from greater than 0 to 400, alternatively from greater than 0 to 350, alternatively from greater than 0 to 325, alternatively from greater than 0 to 300, alternatively from greater than 0 to 275, alternatively from greater than 0 to 250, alternatively from greater than 0 to 225, alternatively from greater than 0 to 200, g/mol. In certain embodiments, including the ranges above, the OH Equivalent weight of the (B) polyol is at least 30 g/mol. Methods of determining OH equivalent weight are known in the art based on functionality and molecular weight of a given polyol.

In these or other embodiments, the (B) polyol has a functionality of from 2 to 10, alternatively from 2 to 9, alternatively from 2 to 8, alternatively from 2 to 7, alternatively from 3 to 6.

In specific embodiments, the (B) polyol comprises, alternatively consists essentially of, alternatively consists of, one or more polyether polyols. Said differently, in these embodiments, the (B) polyol is typically free from any polyols that are not polyether polyols. Specific examples of particularly polyether polyols include a 4.9 functional, sucrose/glycerine initiated polyether polyol, a propoxylated glycerine (polyether triol), and a 7.0 functional, sucrose/glycerine initiated polyether polyol.

It is to be appreciated that when the (B) polyol comprises a blend of two or more different polyols, the properties above may be based on the overall (B) polyol, i.e., averaging the properties of the individual polyols in the (B) polyol, or may relate to a specific polyol in the blend of polyols. Typically, these properties relate to the overall (B) polyol.

In certain embodiments, the (A) organopolysiloxane is present in the (1) isocyanate-reactive component in an amount of from >10 to <99, alternatively from >15 to <99, alternatively from >20 to <99, alternatively from >25 to <99, alternatively from >30 to <99, alternatively from >35 to <99, alternatively from >40 to <99, alternatively from >45 to <99, alternatively from >50 to <99, alternatively from >10 to <98, alternatively from >10 to <71, alternatively from >51 to <98, alternatively from >52 to <96, alternatively from >53 to <94, alternatively from >54 to <92, alternatively from >55 to <90, alternatively from >56 to <88, alternatively from >57 to <86, alternatively from >58 to <84, alternatively from >59 to <82, alternatively from >60 to <80, wt. % based on the combined weight of the (A) organopolysiloxane and the (B) polyol. In other embodiments, the (A) organopolysiloxane is present in the (1) isocyanate-reactive component in an amount of from >10 to <30, alternatively from >10 to <25, alternatively from >10 to <20, alternatively from >11 to <19, alternatively from >12 to <18, alternatively from >13 to <17, alternatively from >14 to <16, wt. % based on the combined weight of the (A) organopolysiloxane and the (B) polyol. Thus, component (B) makes up the remainder of the combined weight of components (A) and (B) in these ranges. In specific embodiments, the (A) organopolysiloxane is present in the (1) isocyanate-reactive component in an amount of from 60 to 75, alternatively from 65 to 75, alternatively from 70 to 75, wt. % based on the combined weight of components (A) and (B). In certain embodiments, the (A) organopolysiloxane is present in the composition in an amount of from 15 to 80 wt. % based on the total weight of the composition.

In certain embodiments, the wt. % of silicone in the backbone of the foamed polyurethane article formed from the composition is from 5 to 80, alternatively from 5 to 70, wt. % based on the components of the (1) isocyanate-reactive component utilized (i.e., without regard to the (C) polyisocyanate described below). An organopolysiloxane having terminal carbinol functional groups that are not polyether groups would have 100 wt. % silicone backbone, and thus the balance of the backbone in the foamed polyurethane article would be attributable to the (B) polyol. However, when the (A) organopolysiloxane includes pendent polyether groups as the carbinol functional groups, the backbone in the foamed polyurethane article from the (1) isocyanate-reactive component is not 100 wt. %, and is a function of the chain length of the polyether groups as carbinol functional groups. Typically, in such embodiments, the (A) organopolysiloxane having pendent polyether groups as the carbinol functional groups has at least 25 wt. % silicone backbone based on the total weight of the (A) organopolysiloxane.

In specific embodiments, the (1) isocyanate-reactive component consists essentially of the (A) organopolysiloxane the (B) polyol, and optionally any chain-extending agent or cross-linking agent. By "consists essentially of" in this context, it is meant that the (1) isocyanate-reactive component is free of components other than the (A) organopolysiloxane and the (B) polyol which react with an isocyanate to give carbamate (urethane) bonds. Thus, the (1) isocyanate-reactive component can comprise other components or additives, such as any of the further components or optional additives described below, even when the (1) isocyanate-reactive component consists essentially of the (A) organopolysiloxane and the (B) polyol, so long as such further components or optional additives themselves do not react with isocyanate to give carbamate bonds.

The composition further comprises (2) an isocyanate component comprising (C) a polyisocyanate. Suitable (C) polyisocyanates have two or more isocyanate functionalities, and include conventional aliphatic, cycloaliphatic, araliphatic and aromatic isocyanates. The (C) polyisocyanate may be selected from the group of diphenylmethane diisocyanates ("MDI"), polymeric diphenylmethane diisocyanates ("pMDI"), toluene diisocyanates ("TDI"), hexamethylene diisocyanates ("HDI"), dicyclohexylmethane diisocyanates ("HMDI"), isophorone diisocyanates ("IPDI"), cyclohexyl diisocyanates ("CHDI"), naphthalene diisocyanate ("NDI"), phenyl diisocyanate ("PDI"), and combinations thereof. In certain embodiments, the (C) polyisocyanate comprises, consists essentially of, or is a pMDI. In one embodiment, the (C) polyisocyanate is of the formula OCN—R—NCO, wherein R is an alkyl moiety, an aryl moiety, or an arylalkyl moiety. In this embodiment, the (C) polyisocyanate can include any number of carbon atoms, typically from 4 to 20 carbon atoms.

Specific examples of suitable (C) polyisocyanates include: alkylene diisocyanates with 4 to 12 carbons in the alkylene moiety, such as 1,12-dodecane diisocyanate, 2-ethyl-1,4-tetramethylene diisocyanate, 2-methyl-1,5-pentamethylene diisocyanate, 1,4-tetramethylene diisocyanate and 1,6-hexamethylene diisocyanate; cycloaliphatic diisocyanates, such as 1,3- and 1,4-cyclohexane diisocyanate as well as any mixtures of these isomers, 1-isocyanato-3,3,5-trimethyl-5-isocyanatomethylcyclohexane, 2,4- and 2,6-hexahydrotoluene diisocyanate as well as the corresponding isomeric mixtures, 4,4'- 2,2'-, and 2,4'-dicyclohexylmethane diisocyanate as well as the corresponding isomeric mixtures; and aromatic diisocyanates and polyisocyanates such as 2,4- and 2,6-toluene diisocyanate and the corresponding isomeric mixtures, 4,4'-, 2,4'-, and 2,2'-diphenylmethane diisocyanate and the corresponding isomeric mixtures, mixtures of 4,4'-, 2,4'-, and 2,2-diphenylmethane diisocyanates and polyphenylenepolymethylene polyisocyanates, as well as mixtures of MDI and toluene diisocyanate (TDI).

The (C) polyisocyanate may include modified multivalent isocyanates, i.e., products obtained by the partial chemical reaction of organic diisocyanates and/or polyisocyanates. Examples of suitable modified multivalent isocyanates include diisocyanates and/or polyisocyanates containing ester groups, urea groups, biuret groups, allophanate groups, carbodiimide groups, isocyanurate groups, and/or urethane groups. Specific examples of suitable modified multivalent isocyanates include organic polyisocyanates containing urethane groups and having an NCO content of 15 to 33.6 parts by weight based on the total weight, e.g. with low molecular weight diols, triols, dialkylene glycols, trialkylene glycols, or polyoxyalkylene glycols with a molecular weight of up to 6000; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Prepolymers containing NCO groups with an NCO content of from 3.5 to 29 parts by weight based on the total weight of the (C) polyisocyanate and produced from the polyester polyols and/or polyether polyols; 4,4'-diphenylmethane diisocyanate, mixtures of 2,4'- and 4,4'-diphenylmethane diisocyanate, 2,4- and/or 2,6-toluene diisocyanates or polymeric MDI are also suitable. Furthermore, liquid polyisocyanates containing carbodiimide groups having an NCO content of from 15 to 33.6 parts by weight based on the total weight of the (2) isocyanate component, may also be suitable, e.g. based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'- and/or 2,6-toluene diisocyanate.

It is to be appreciated that the (C) polyisocyanate may include any combination of two or more polyisocyanates that are different from one another based on functionality, molecular weight, viscosity, or structure. In specific embodiments, the (C) polyisocyanate comprises, consists essentially of, or is, a pMDI.

The (C) polyisocyanate typically has a functionality of from 2.0 to 5.0, alternatively from 2.0 to 4.5, alternatively from 2.0 to 4.0, alternatively from 2.0 to 3.5.

In these or other embodiments, the (C) polyisocyanate has an NCO by weight of from 15 to 60, alternatively from 15 to 55, alternatively from 20 to 48.5, wt. %. Methods of determining content of NCO by weight are known in the art based on functionality and molecular weight of the particularly isocyanate.

The (C) polyisocyanate is typically present in the composition in an amount to provide an isocyanate index of from 80 to 200, alternatively from 80 to 130, alternatively from 85 to 125, alternatively from 90 to 120, alternatively from 95 to 120, alternatively from 100 to 120, alternatively from 105 to 115. Isocyanate index is the molar ratio of NCO to isocyanate-reactive hydrogen functional groups, times 100. Isocyanate index and methods of its calculation are well known in the art.

The composition includes further comprises (D) a blowing agent. In instances where a blowing agent is already present, e.g. water, or generated during reaction, e.g. carbon dioxide, the blowing agent may be referred to as a supplemental blowing agent, although the supplemental blowing agent may provide a majority or all of the foaming during cure of the composition. The (D) blowing agent can be selected from the group of chemical blowing agents, physical blowing agents, and combinations thereof. Examples of such blowing agents are described below.

The amount of blowing agent utilized can vary depending on the desired outcome. For example, the amount of blowing agent can be varied to tailor final foam density and foam rise profile, as well as cell size, in the foamed polyurethane article.

In various embodiments, the (D) blowing agent comprises the chemical blowing agent, and the chemical blowing agent is selected from the group of Si—OH compounds, which may be monomers, oligomers, or polymers. In certain embodiments, the chemical blowing agent is selected from the group consisting of organosilanes and organosiloxanes having at least one silanol (Si—OH) group. Examples of suitable OH-functional compounds include dialkyl siloxanes, such as OH-terminated dimethyl siloxanes. Such siloxanes may have a relatively low viscosity, such as 10 to 5,000, 10 to 2,500, 10 to 1,000, 10 to 500, or 10 to 100, mPa·s at 25° C.

In specific embodiments, the chemical blowing agent comprises, alternatively is, water. The amount of water present in the total mass of the composition (prior to reaction) is typically from 0.02 to 1.00, alternatively from 0.03 to 0.9, alternatively from 0.05 to 0.8, alternatively from 0.1 to 0.7, wt. % based on the total weight of the composition.

In various embodiments, the composition includes a physical blowing agent. The physical blowing agent may be used in addition or alternately to the chemical blowing agent.

In various embodiments, the physical blowing agent is one that undergoes a phase change from a liquid to a gaseous state during exposure to atmospheric pressure and a temperature ≥10° C., alternatively ≥20° C., alternatively ≥30° C., alternatively ≥40° C., alternatively ≥50° C., alternatively ≥60° C., alternatively ≥70° C., alternatively ≥80° C., alternatively ≥90° C., alternatively ≥100° C. The boiling point temperature generally depends upon the particular type of physical blowing agent.

Useful physical blowing agents include hydrocarbons, such as pentane and hexane; halogenated (e.g. chlorinated and/or fluorinated) hydrocarbons, such as methylene chloride, chloroform, trichloroethane, chlorofluorocarbons, and hydrochlorofluorocarbons ("HCFCs"); ethers; ketones and esters, such as methyl formate, ethyl formate, methyl acetate or ethyl acetate. The physical blowing agent may be a liquid or a gas, and the examples above are typically utilized as liquids which volatilize during foam preparation. Examples of physical blowing agents that may be gases at room temperature include air, nitrogen and/or carbon dioxide. In specific embodiments, the physical blowing agent comprises or is n-pentane and/or cyclopentane. In certain embodiments, the physical blowing agent comprises a compound selected from the group consisting of propane, butane, isobutane, isobutene, isopentane, cyclopentane, n-pentane, dimethylether, or mixtures thereof. In many embodiments, the blowing agent comprises a compound that is inert, i.e., does not react with other components of the composition. Inert in this context refers to reactivity, not volatility.

In various embodiments, the physical blowing agent comprises a hydrofluorocarbon ("HFC"). "Hydrofluorocarbon" and "HFC" are interchangeable terms and refer to an organic compound containing hydrogen, carbon, and fluorine. The organic compound is substantially free of halogens other than fluorine.

Examples of suitable HFCs include aliphatic compounds such as 1,1,1,3,3-pentafluoropropane (HFC-245fa), 1,1,1,3,3-pentafluorobutane (HFC-365mfc), 1-fluorobutane, nonafluorocyclopentane, perfluoro-2-methylbutane, 1-fluorohexane, perfluoro-2,3-dimethylbutane, perfluoro-1,2-dimethylcyclobutane, perfluorohexane, perfluoroisohexane, perfluorocyclohexane, perfluoroheptane, perfluoroethylcyclohexane, perfluoro-1,3-dimethyl cyclohexane, and perfluorooctane, 1,1,1,2-tetrafluoroethane (HFC-134a); as well as aromatic compounds such as fluorobenzene, 1,2-difluorobenzene; 1,4-difluorobenzene, 1,3-difluorobenzene; 1,3,5-trifluorobenzene; 1,2,4,5-tetrafluorobenzene, 1,2,3,5-tetrafluorobenzene, 1,2,3,4-tetrafluorobenzene, pentafluorobenzene, hexafluorobenzene, and 1-fluro-3-(trifluoromethyl)benzene. In certain embodiments, HFC-365mfc and HFC-245fa may be preferred due to their increasing availability and ease of use, with HFC-365mfc having a higher boiling point than HFC-245fa which may be useful in certain applications. For example, HFCs having a boiling point higher than 30° C., such as HFC-365mfc, may be desirable because they do not require liquefaction during foam processing.

An additional example of a physical blowing agent a hydrofluoro-olefin (HFO), such as trans-1,3,3,3-tetrafluoroprop-1-ene (HFO-1234ze, available from Honeywell under the Solstice ze tradename), trans-1-chloro-3,3,3-trifluoropropene (HFO-1233zd, available from Arkema under the Forane tradename), 2,3,3,3-Tetrafluoroprop-1-ene (HFO-1234yf, available from Honeywell under the Solstice yf tradename, and Chemours under the Opteon YF tradename), cis-1,1,1,4,4,4-hexafluoro-2-butene (HFO-1336mzz-Z, available from Chemours under the Opteon MZ tradename), and Opteon 1150.

In certain embodiments, the (D) blowing agent and composition are free from any physical blowing agent that is discretely added in or to the composition. Said differently, nominal amounts of gas may inherently form during curing of the composition, which gas is not considered a physical blowing agent for purposes of this disclosure because it is not included in the composition or (D) blowing agent as a discrete component. In specific embodiments, water is the only (D) blowing agent present in the composition.

The (D) blowing agent may be present in the (1) isocyanate-reactive component, along with components (A) and (B), or may be a separate component in the composition.

The composition additionally comprises a (E) a catalyst.

In one embodiment, the (E) catalyst comprises a tin catalyst. Suitable tin catalysts include tin(II) salts of organic carboxylic acids, e.g. tin(II) acetate, tin(II) octoate, tin(II) ethylhexanoate and tin(II) laurate. In one embodiment, the (E) catalyst comprises dibutyltin dilaurate, which is a dialkyltin(IV) salt of an organic carboxylic acid. Specific examples of suitable organometallic catalyst, e.g. dibutyltin dilaurates, are commercially available from Air Products and Chemicals, Inc. of Allentown, PA, under the trademark DABCOO. The organometallic catalyst can also comprise other dialkyltin(IV) salts of organic carboxylic acids, such as dibutyltin diacetate, dibutyltin maleate and dioctyltin diacetate.

Examples of other suitable catalysts include iron(II) chloride; zinc chloride; lead octoate; tris(dialkylaminoalkyl)-s-hexahydrotriazines, including tris(N,N-dimethylaminopropyl)-shexahydrotriazine; tetraalkylammonium hydroxides, including tetramethylammonium hydroxide; alkali metal hydroxides, including sodium hydroxide and potassium hydroxide; alkali metal alkoxides, including sodium methoxide and potassium isopropoxide; and alkali metal salts of long-chain fatty acids having from 10 to 20 carbon atoms and/or lateral OH groups.

Further examples of other suitable catalysts, specifically trimerization catalysts, include N,N,N-dimethylaminopropylhexahydrotriazine, potassium, potassium acetate, N,N,N-trimethyl isopropyl amine/formate, and combinations thereof.

Yet further examples of other suitable catalysts, specifically tertiary amine catalysts, include dimethylaminoethanol, dimethylaminoethoxyethanol, triethylamine, N,N,N',N'-tetramethylethylenediamine, triethylenediamine (also known as 1,4-diazabicyclo[2.2.2]octane), N,N-dimethylaminopropylamine, N,N,N',N',N"-pentamethyldipropylenetriamine, tris(dimethylaminopropyl)amine, N,N-dimethylpiperazine, tetramethylimino-bis(propylamine), dimethylbenzylamine, trimethylamine, triethanolamine, N,N-diethyl ethanolamine, N-methylpyrrolidone, N-methylmorpholine, N-ethylmorpholine, bis(2-dimethylaminoethyl)ether, N,N-dimethylcyclohexylamine ("DMCHA"), N,N,N',N',N"-pentamethyldiethylenetriamine, 1,2-dimethylimidazole, 3-(dimethylamino) propylimidazole, 2,4,6-tris (dimethylaminomethyl) phenol, and combinations thereof. The (E) catalyst can comprise delayed action tertiary amine based on 1,8-diazabicyclo[5.4.0]undec-7-ene ("DBU"). Alternatively or in addition, the (E) catalyst can comprise N,N,N'-trimethyl-N'-hydroxyethyl-bisaminoethylether and/or ethylenediamine. The tertiary amine catalysts can be further modified for use as delayed action catalysts by addition of approximately the same stoichiometric amount of acidic proton containing acid, such as phenols or formic acid. Such delayed action catalysts are commercially available from Air Products and Evonik.

The (E) catalyst may be utilized neat or disposed in a carrier vehicle. Carrier vehicles are known in the art and further described below as an optional component for the composition. If the carrier vehicle is utilized and solubilizes the (E) catalyst, the carrier vehicle may be referred to as a solvent. The carrier vehicle can be isocyanate-reactive, e.g. an alcohol-functional carrier vehicle, such as dipropylene glycol.

The (E) catalyst can be utilized in various amounts. The (E) catalyst may include any combination of different catalysts. The (E) catalyst may be present in the (1) isocyanate-reactive component, along with components (A) and (B), or may be a separate component in the composition.

The composition may optionally further include an additive component. The additive component may be selected from the group of catalysts, blowing agents, plasticizers, cross-linking agents, chain-extending agents, chain-terminating agents, wetting agents, surface modifiers, surfactants, waxes, foam stabilizing agents, moisture scavengers, desiccants, viscosity reducers, cell-size reducing compounds, reinforcing agents, dyes, pigments, colorants, fillers, flame retardants, mold release agents, anti-oxidants, compatibility agents, ultraviolet light stabilizers, thixotropic agents, anti-aging agents, lubricants, coupling agents, solvents, rheology promoters, adhesion promoters, thickeners, fire retardants, smoke suppressants, anti-static agents, anti-microbial agents, and combinations thereof.

One or more of the additives can be present as any suitable weight percent (wt. %) of the composition, such as 0.1 wt. % to 15 wt. %, 0.5 wt. % to 5 wt. %, or 0.1 wt. % or less, 1 wt. %, 2, 3, 4, 5, 6, 7, 8, 9, 10, 11, 12, 13, 14, or 15 wt. % or more of the composition. One of skill in the art can readily determine a suitable amount of additive depending, for example, on the type of additive and the desired outcome. Certain optional additives are described in greater detail below.

Suitable carrier vehicles include silicones, both linear and cyclic, organic oils, organic solvents and mixtures of these.

The carrier vehicle may also be a low viscosity organopolysiloxane or a volatile methyl siloxane or a volatile ethyl siloxane or a volatile methyl ethyl siloxane having a viscosity at 25° C. in the range of 1 to 1,000 mm$^2$/see, such as hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, heptamethyl-3-{(trimethylsilyl)oxy)}trisiloxane, hexamethyl-3,3,bis{(trimethylsilyl)oxy}trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, and any mixtures thereof.

Suitable surfactants (or "foaming aids") include silicone polyethers, ethylene oxide polymers, propylene oxide polymers, copolymers of ethylene oxide and propylene oxide, other non-ionic surfactants, and combinations thereof. When the composition comprises a silicone polyether as a surfactant, the surfactant is distinguished from component (A), which component (A) is a reactive component of the (1) isocyanate-reactive component and not a surfactant. In addition, component (A) is present in the composition in a concentration much greater than that of a surfactant. Further suitable surfactants may comprise a nonionic surfactant, a cationic surfactant, an anionic surfactant, an amphoteric surfactant, or a mixture of such surfactants.

In various embodiments, the composition comprises a fluorocarbon surfactant or fluorinated surfactant. The fluorinated surfactants can be any of those compounds known in the art which contain fluorine atoms on carbon and are also surfactants. These fluorinated surfactants can be organic or silicon containing. For example, fluorinated organic surfactants can be perfluorianted polyethers such as those which have repeating units of the formulae:

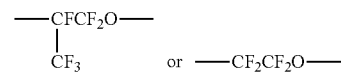

or and mixtures of such units.

Silicon-containing fluorinated surfactants can be siloxanes, for example, which contain organic radicals having fluorine bonded thereto, such as siloxanes having repeating units of the formulae:

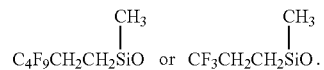

In various embodiments, adding the fluorinated surfactant to the composition decreases the cured foam density. In general, increasing the amount of fluorinated surfactant in the composition decreases the density of the foamed polyurethane article. This is especially true for slow cure systems, where the surfactant stabilizes bubbles while the network forms and cures.

In various embodiments, the composition further comprises an organopolysiloxane resin ("resin"). Suitable resins are as describe above. In certain embodiments, the resin is an MQ resin. The resin can be useful for stabilizing the foamed polyurethane article, i.e., the resin may be a foam stabilizing agent.

Suitable pigments are understood in the art. In various embodiments, the composition further comprises carbon black, e.g. acetylene black.

The composition may include one or more fillers. The fillers may be one or more reinforcing fillers, non-reinforcing fillers, extending fillers, or mixtures thereof. Examples of finely divided, reinforcing fillers include high surface area fumed and precipitated silicas including rice hull ash and to a degree calcium carbonate. Fumed silica can include types that are surface-functionalized, such as hydrophilic or hydrophobic, and are available from Cabot Corporation under the CAB-O-SIL tradename. Examples of finely divided non-reinforcing fillers include crushed quartz, diatomaceous earths, barium sulphate, iron oxide, titanium dioxide and carbon black, talc, and wollastonite. Other fillers which might be used alone or in addition to the above include carbon nanotubes, e.g. multiwall carbon nanotubes aluminite, hollow glass spheres, calcium sulphate (anhydrite), gypsum, calcium sulphate, magnesium carbonate, clays such as kaolin, aluminum trihydroxide, magnesium hydroxide (brucite), graphite, copper carbonate, e.g. malachite, nickel carbonate, e.g. zarachite, barium carbonate, e.g. witherite and/or strontium carbonate e.g. strontianite. Further alternative fillers include aluminum oxide, silicates from the group consisting of olivine group; garnet group; aluminosilicates; ring silicates; chain silicates; and sheet silicates. In certain embodiments, the composition includes at least one filler comprising hollow particles, e.g. hollow spheres. Such fillers can be useful for contributing to porosity and/or overall void fraction of the foamed polyurethane article. Fillers, when utilized, can be used in the composition in amounts of from 0.01 to 50, alternatively from 0.05 to 40, alternatively from 0.1 to 35, wt. % based on the total weight of the composition. In addition, fumed silica, if utilized, can be used in amounts from 0.01 to 5, alternatively from 0.05 to 3, alternatively from 0.1 to 2.5, alternatively from 0.2 to 2.2 wt. % based on the total weight of the composition.

The filler, if present, may optionally be surface treated with a treating agent. Treating agents and treating methods are understood in the art. The surface treatment of the filler(s) is typically performed, for example with a fatty acid or a fatty acid ester such as a stearate, or with organosilanes, organosiloxanes, or organosilazanes such as hexaalkyl disilazane or short chain siloxane diols. Generally, the surface treatment renders the filler(s) hydrophobic and therefore easier to handle and obtain a homogeneous mixture with the other components in the composition. Silanes such as those of formula $R^4_e Si(OR^5)_{4-e}$ where $R^4$ is a substituted or unsubstituted monovalent hydrocarbon group of 6 to 20 carbon atoms, for example, alkyl groups such as hexyl, octyl, dodecyl, tetradecyl, hexadecyl, and octadecyl, and aralkyl groups such as benzyl and phenylethyl, $R^5$ is an alkyl group of 1 to 6 carbon atoms, and subscript "e" is equal to 1, 2 or 3, may also be utilized as the treating agent for fillers.

In various embodiments, the composition further comprises an adhesion promoter, or adhesion-imparting agent. The adhesion-imparting agent can improve adhesion of the foamed polyurethane article to a base material being contacted during curing. In certain embodiments, the adhesion-imparting agent is selected from organosilicon compounds having at least one alkoxy group bonded to a silicon atom in a molecule. This alkoxy group is exemplified by a methoxy group, an ethoxy group, a propoxy group, a butoxy group, and a methoxyethoxy group. Moreover, non-alkoxy groups bonded to a silicon atom of this organosilicon compound are exemplified by substituted or non-substituted monovalent hydrocarbon groups such as alkyl groups, alkenyl groups, aryl groups, aralkyl groups, halogenated alkyl groups and the like; epoxy group-containing monovalent organic groups such as a 3-glycidoxypropyl group, a 4-glycidoxybutyl group, or similar glycidoxyalkyl groups; a 2-(3,4-epoxycyclohexyl)ethyl group, a 3-(3,4-epoxycyclohexyl)propyl group, or similar epoxycyclohexylalkyl groups; and a 4-oxiranylbutyl group, an 8-oxiranyloctyl group, or similar oxiranylalkyl groups; acrylic group-containing monovalent organic groups such as a 3-methacryloxypropyl group and the like; and a hydrogen atom.

In specific embodiments in which the adhesion-imparting agent comprises the organosilicon compound, the organosilicon compound has a silicon-bonded alkenyl group or silicon-bonded hydrogen atom. Moreover, due to the ability to impart good adhesion with respect to various types of base materials, this organosilicon compound may have at least one epoxy group-containing monovalent organic group in a molecule. This type of organosilicon compound is exemplified by organosilane compounds, organosiloxane oligomers and alkyl silicates. Molecular structure of the organosiloxane oligomer or alkyl silicate is exemplified by a linear chain structure, partially branched linear chain structure, branched chain structure, ring-shaped structure, and net-shaped structure. A linear chain structure, branched chain structure, and net-shaped structure are typical. This type of organosilicon compound is exemplified by silane compounds such as 3-glycidoxypropyltrimethoxysilane, 2-(3,4-epoxycyclohexyl)-ethyitrimethoxysilane, 3-methacryloxy propyitrimethoxysilane, and the like; siloxane compounds having at least one silicon-bonded alkenyl group or silicon-bonded hydrogen atom, and at least one silicon-bonded alkoxy group in a molecule; mixtures of a silane compound or siloxane compound having at least one silicon-bonded alkoxy group and a siloxane compound having at least one silicon-bonded hydroxyl group and at least one silicon-bonded alkenyl group in the molecule; and methyl polysilicate, ethyl polysilicate, and epoxy group-containing ethyl polysilicate.

In specific embodiments, the composition, and in particular, the (1) isocyanate-reactive component, can further comprise a chain-extending agent. Suitable chain extending agents include any of the components listed above as initiators for the (B) polyol, which may be used alone or in combination as the chain-extending agent, when present, separate from and in addition to the (B) polyol. The chain extending agent typically includes a hydroxyl group at each terminal.

Any of the optional additives, if utilized in the composition, may be present in the (1) isocyanate-reactive component or as a separate component in the composition. Alternatively, optional additives that are not isocyanate-reactive, e.g. fillers, etc., may be included in the (2) isocyanate component. Typically, the composition is a 2 k (two-component) composition, where the (2) isocyanate component consists of the (C) polyisocyanate and the (1) isocyanate-reactive component comprises components (A), (B), (D), (E), and any optional components utilized in the composition.

In certain embodiments, the (1) isocyanate-reactive component has a viscosity at 25° C. of less than 1,500, alternatively less than 1,400, alternatively less than 1,300, alternatively less than 1,200, alternatively less than 1,100, alternatively less than 1,000, alternatively less than 900, alternatively less than 875, alternatively less than 850, centipoise. Dynamic viscosity may be measured via a TA Instruments AR 2000 rheometer with 45 mm cone-plate geometry at a constant shear rate of 10 s$^{-1}$ with temperature ramp rate of 3° C./min from 20 to 80° C. Kinematic viscosity can be measured in accordance with ASTM D445. These ranges apply even when the composition is a 2 k composition and the (1) isocyanate-reactive component includes everything in the composition other than the (C) polyisocyanate. This viscosity range allows for the (1) isocyanate-reactive component to flow freely, which is advantageous for certain end use applications where foaming is desired in or on certain substrates or articles, including those defining gaps and/or orifices.

The composition may be prepared by combining the (1) isocyanate-reactive component and the (2) isocyanate component, as well as components (D) and (E), and any optional components, if not present in the (1) isocyanate-reactive components, in any order of addition. As described in greater detail below, the composition may be a one part composition, a two component or 2K composition, or a multi-part composition. When the (1) isocyanate-reactive component and the (2) isocyanate component are combined, particularly in the presence of the (E) catalyst, a reaction is initiated, which results in a foamed polyurethane article. The foamed polyurethane article can be formed at room temperature and ambient conditions. Alternatively, at least one condition may be selectively modified during formation of the foamed polyurethane article, e.g. temperature, humidity, pressure, etc.

The foamed polyurethane article comprising the reaction product of the composition is also disclosed.

In many embodiments, the foamed polyurethane article is a closed-cell foam. In various embodiments, the foamed polyurethane article has a density <1.5 grams per cubic centimeter (g/cm$^3$), alternatively <1.4 g/cm$^3$, alternatively <1.3 g/cm$^3$, alternatively <1.2 g/cm$^3$, alternatively <1.1 g/cm$^3$, alternatively <1.0 g/cm$^3$, alternatively <0.9 g/cm$^3$, alternatively <0.8 g/cm$^3$, alternatively <0.7 g/cm$^3$, alternatively <0.6 g/cm$^3$, alternatively from >0.1 to <0.6 g/cm$^3$.

If density is too high, the foamed polyurethane article may be too heavy or stiff for certain applications. If density is too low, the foamed polyurethane article may lack desired structural integrity for certain applications. Density of the foamed polyurethane article can be determined via methods understood in the art. For example, density of the foamed polyurethane article can be measured via the Archimedes principle, using a balance and density kit, and following standard instructions associated with such balances and kits. An example of a suitable balance is a Mettler-Toledo XS205DU balance with density kit.

In various embodiments, the foamed polyurethane article has pores that are generally uniform in size and/or shape and/or distribution. In certain embodiments, the foamed polyurethane article has an average pore size ≤5 millimeters, alternatively ≤2.5 millimeters, alternatively ≤1 millimeter, alternatively ≤0.75 millimeters, alternatively from 0.3 to 0.7 millimeters, alternatively from 0.4 to 0.6 millimeters.

Average pore size can be determined via methods understood in the art. For example, ATSM method D3576-15 with the following modifications may be used: (1) imaging a foam using optical or electron microscopy rather than projecting the image on a screen; and (2) scribing a line of known length that spans greater than 15 cells rather than scribing a 30 mm line.

In these or other embodiments, the foamed polyurethane article substantially resists shrinking after formation. By substantially resists shrinking, it is meant that the foamed polyurethane article does not shrink more than 20%, alternatively not more than 18%, alternatively not more than 16%, alternatively not more than 14%, alternatively not more than 12%, alternatively not more than 10%, alternatively not more than 8%, alternatively not more than 6%, alternatively not more than 4%, alternatively not more than 2%, in any dimension, over a period of time. The period of time may be an hour, a day, a week, a month, a year, or more. The foamed polyurethane article typically has one or more glass transition temperatures ($T_g$), where the highest value of the one or more $T_g$ has a value of at least 15, alternatively at least 20, alternatively at least 25, alternatively at least 30, ° C. $T_g$ is evaluated as the peak of the tan delta peak, where the tan delta is the ratio of the loss modulus to storage modulus, as measured from a dynamic mechanical thermal analysis (DMTA) experiment with a strain cycling frequency of 1 Hz, and a temperature scan of 3° C./min over a range that covers at least 0 to 70° C. or wider.

The foamed polyurethane article, as well as a composite article comprising a substrate and the foamed polyurethane article together, can be formed by disposing the composition on a substrate, and curing the composition.

The composition may be disposed or dispensed on the substrate in any suitable manner. Typically, the composition is applied in wet form via a wet coating technique. The composition may be applied by i) spin coating; ii) brush coating; iii) drop coating; iv) spray coating; v) dip coating; vi) roll coating; vii) flow coating; viii) slot coating; ix) gravure coating; x) Meyer bar coating; or xi) a combination of any two or more of i) to x).

The substrate is not limited and may be any substrate. The foamed polyurethane article may be separable from the substrate, e.g. if the substrate is a mold, or may be physically and/or chemically bonded to the substrate depending on its selection. The substrate may optionally have a continuous or non-continuous shape, size, dimension, surface roughness, and other characteristics.

Alternatively, the substrate may comprise a plastic, which maybe a thermoset and/or a thermoplastic. However, the substrate may alternatively be or comprise glass, ceramic, metals such as titanium, magnesium, aluminum, carbon steel, stainless steel, nickel coated steel or alloys of such metal or metals, or a combination of different materials. Because the composition can cure at ambient conditions, elevated temperatures are not required to effect curing, which can damage certain substrates.

Specific examples of suitable substrates include polymeric substrates such polyamides (PA); polyesters such as polyethylene terephthalates (PET), polybutylene terephthalates (PET), polytrimethylene terephthalates (PTT), polyethylene naphthalates (PEN), and liquid crystalline polyesters; polyolefins such as polyethylenes (PE), ethylene/acidic monomer copolymers such as is available from Dow under the tradename Surtyn, polypropylenes (PP), and polybutylenes; polystyrene (PS) and other styrenic resins such as SB rubber; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones; polyvinyl alcohols (PVA); polyetheretherketones (PEEK); polyetherketoneketones (PEKK); polyarylates (PAR); polyethemitriles (PEN); phenolic resins; phenoxy resins; celluloses such as triacetylcellulose, diacetylcellulose, and cellophane; fluorinated resins, such as polytetrafluoroethylenes; thermoplastic elastomers, such as polystyrene types, polyolefin types, polyurethane types, polyester types, polyamide types, polybutadiene types, polyisoprene types, and fluoro types; and copolymers, and combinations thereof. Thermosetting resins can include epoxy, polyurethane, polyurea, phenol-formaldehyde, urea-formaldehyde, or combinations thereof. The substrate can include a coating, film, or layer disposed thereon. Coatings made from polymer latex can be used, such as latex from acrylic acid, acrylate, methacrylate, methacrylic acid, other alkylacrylate, other alkylacrylic acid, styrene, isoprene butylene monomers, or latex from the alkyl esters of the acid monomers mentioned in the foregoing, or latex from copolymers of the foregoing monomers. Composites based on any of these resins can be used as substrates by combining with glass fibers, carbon fibers, or solid fillers such as calcium carbonate, clay, aluminum hydroxide, aluminum oxide, silicon dioxide, glass spheres, sawdust, wood fiber, or combination thereof.

In specific embodiments, the substrate defines at least one gap, and disposing the composition comprises disposing the composition in the at least one gap such that the foamed polyurethane article is present within the gap in the composite article. Due to the low viscosity of the composition, the composition is generally flowable and will conform to the shape of the substrate at ambient conditions, including room temperature and atmospheric pressure.

In one specific embodiment, the substrate comprises a battery cell and the composite article comprises a battery pack. However, the composition and foamed polyurethane article may be used in other end use applications, including as a pottant or encapsulant in end uses other than battery packs, such as for electric circuits, as well as for purposes other than a pottant or encapsulant.

Embodiment 1 relates to an isocyanate-reactive composition, comprising: (A) an organopolysiloxane having an average of at least two carbinol functional groups per molecule; and (B) a polyol; wherein the (A) organopolysiloxane is present in an amount of from >10 to <99 wt. % based on the combined weight of the (A) organopolysiloxane and the (B) polyol.

Embodiment 2 relates to a composition for preparing a foamed polyurethane article, the composition comprising: (1) an isocyanate-reactive component, the (1) isocyanate-reactive component being that of embodiment 1; and (2) an isocyanate component comprising (C) a polyisocyanate; wherein the composition further comprises: (D) a blowing agent; and (E) a catalyst.

Embodiment 3 relates to the composition of Embodiment 1 or 2, wherein: (i) the carbinol functional groups are the same as one another; (ii) the carbinol functional groups have the general formula -D-O$_a$—(C$_b$H$_{2b}$O)$_c$—H, where D is a covalent bond or a divalent hydrocarbon linking group having from 2 to 18 carbon atoms, subscript a is 0 or 1, subscript b is independently selected from 2 to 4 in each moiety indicated by subscript c, and subscript c is from 0 to 500, with the proviso that subscripts a and c are not simultaneously 0; or (iii) both (i) and (ii).

Embodiment 4 relates to the composition of any one of Embodiments 1-3, wherein, in at least one of the carbinol functional groups: (i) subscript D is a divalent hydrocarbon linking group having from 2 to 18 carbon atoms, subscript a is 1, and subscript c is 0 such that the carbinol functional group has the general formula -D-OH; (ii) the carbinol functional groups are terminal; or (iii) both (i) and (ii).

Embodiment 5 relates to the composition of any one of Embodiments 1-3, wherein: (i) at least one of the carbinol functional groups has the general formula:

—D—O$_a$—[C$_2$H$_4$O]$_x$[C$_3$H$_6$O]$_y$[C$_4$H$_8$O]$_z$—H;

where D is a covalent bond or a divalent hydrocarbon linking group having from 2 to 18 carbon atoms, subscript a is 0 or 1, 0≤x≤500, 0≤y≤500, and 0≤z≤500, with the proviso that 1≤x+y+z≤500; (ii) the carbinol functional groups are pendent; or (iii) both (i) and (ii).

Embodiment 6 relates to the composition of any one of Embodiments 1-3, wherein: (i) component (A) has an OH equivalent weight of from 400 to 1,200 g/mol; (ii) component (A) has a viscosity at 25° C. of from 1 to 1,000 mPa·s; (iii) component (A) is substantially linear; (iv) at least one of the carbinol functional groups is pendent; (v) at least one of the carbinol functional groups is terminal; (vi) component (A) is present in the composition in an amount of from 15 to 80 wt. % based on the total weight of the composition; (vii) component (A) has the general formula:

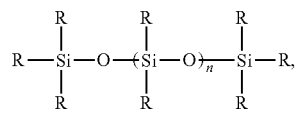

where each R is an independently selected hydrocarbyl group or comprises a carbinol functional group, with the proviso that at least two of R independently comprise a carbinol functional group, and subscript n is from 0 to 100; of (viii) any combination of (i) to (vii).

Embodiment 7 relates to the composition of any one of Embodiments 1-6, wherein component (B): (i) has a number-average functionality of from 2 to 8; (ii) has an average OH equivalent weight of from greater than 0 to 2,000; (iii) is a polyether polyol; or (iv) any combination of (i) to (iii).

Embodiment 8 relates to the composition of any one of Embodiments 2-7, wherein: (i) component (C) comprises polymeric MDI (pMDI); (ii) the isocyanate-reactive component has a viscosity at 25° C. of less than 1,000 mPa·s; or (iii) both (i) and (ii).

Embodiment 9 relates to a foamed polyurethane article comprising the reaction product of the composition of any one of Embodiments 1-8.

Embodiment 10 relates to the foamed polyurethane article of Embodiment 9 having: (i) a closed-cell structure; (ii) a glass transition temperature (T$_g$) of greater than 20° C.; (iii) a density of from 0.1 to 0.6 g/cm$^3$; or (iv) any combination of (i) to (iii).

Embodiment 11 relates to use of the foamed polyurethane article of Embodiment 9 or 10 as an encapsulant, a pottant, a thermal barrier, and/or in automotive applications.

Embodiment 12 relates to a method of preparing a composite article, the method comprising: disposing a composition on a substrate, and curing the composition to give a foamed polyurethane article on the substrate and prepare the composite article, wherein the composition is the composition of any one of Embodiments 1-8.

Embodiment 13 relates to the method of Embodiment 12 wherein the substrate defines at least one gap and disposing the composition comprises disposing the composition in the at least one gap such that the foamed polyurethane article is present within the gap in the composite article.

Embodiment 14 relates to the method of Embodiment 12 or 13 wherein the substrate comprises a battery cell and the composite article comprises a battery pack.

Embodiment 15 relates to the composite article formed in accordance with the method of any one of Embodiments 12 to 14.

INDUSTRIAL APPLICABILITY

The compositions, foamed polyurethane articles, and methods of this disclosure are useful for a variety of end applications, and are not limited to a particular one. Examples of suitable applications include space filling applications, automotive applications (e.g. for control modules), and the like. The foamed polyurethane articles can be used to at least partially cover or encapsulate articles, such as batteries and other electronic components. The foamed polyurethane articles can also be used for thermal insulation. Moreover, the foamed polyurethane articles can be used as a fire block. In general, the foamed polyurethane articles of this disclosure provide a combination of desirable physical properties relative to conventional foams, including one or more of the following: reduced weight, lowered density, increased thermal resistance, increased stability, etc. The foamed polyurethane articles can be formed in environments where the formation of hydrogen gas is a concern. In addition, the foamed polyurethane articles can be foamed at room temperature or thereabout, which is useful for temperature sensitive applications.

The following examples, illustrating embodiments of this disclosure, are intended to illustrate and not to limit the invention. Unless otherwise noted, all reactions are carried out under air, and all components are purchased or otherwise obtained from various commercial suppliers.

The following equipment and characterization procedures/parameters are used to evaluate various physical properties of the compounds and compositions prepared in the examples below.

Kinematic viscosity was measured in accordance with ASTM D445 unless otherwise stated.

Capillary viscosity (kinematic viscosity via glass capillary) was measured via Dow Corning Corporate Test Method CTM0004 method of 20 Jul. 1970, for silicone containing materials (Components (A1), (A2), (A3), (F1) and (F2)). CTM0004 is known in the art and based on ASTM D445, IP 71.

Dynamic viscosity of each Part B (described below) was measured on a TA Instruments AR 2000 rheometer with 45 mm cone-plate geometry. Data were collected at a constant shear rate of 10 s$^{-1}$ with temperature ramp rate of 3° C./min from 20 to 80° C. The value of viscosity at 25° C. is noted from this measurement.

Initial dynamic viscosity of each reaction mixture as set forth in Tables 6-8 was measured in the absence of any catalyst or blowing agent (e.g. water) to avoid damage to metal plates from blowing/gelling during viscosity measurements and clean-up. The remaining components of Parts A and B were thoroughly mixed in the appropriate ratio (1:0.63 by mass of B:A) in a SpeedMixer DAC 150.1 FVZ from FlackTek Inc. using Max 40 Tal cup for 6 seconds at 2500 rpm. The mixing was carried out adjacent to the rheometer (AR2000 by TA Instruments from Delaware) to avoid transfer time of the reaction mixture. The calibration sequence steps were 15 seconds long. The first measurement was taken after 5 seconds upon calibration and equilibrium completion. The measurements were taken with a constant temperature at 25° C. The first time point for recording the reactive viscosity is ¢27 seconds after the mixing of isocyanate with the rest of the mixture is initiated at a constant shear rate of 10 s$^{-1}$ with a 45 mm cone-and-plate geometry.

NCO content by weight of component (C) (i.e., (C1), (C2), and (C3)) was determined in accordance with ASTM D5155.

The various components utilized in the Examples are set forth in Table 1 below.

TABLE 1

Components/Compounds Utilized

| Component | Description |
|---|---|
| Component (A1) | A linear trimethylsiloxy end-blocked organopolysiloxane having pendent polyether polyol functionality and dimethylsiloxy units, a capillary viscosity at 25° C. of 550 mPa · s, and an OH equivalent weight of 1089 g/mol. |
| Component (A2) | A linear organopolysiloxane comprising dimethylsiloxy units and 3-hydroxylpropyl functionality at each terminal. Component (A2) has a capillary viscosity at 25° C. of 40-80 mPa · s, and an OH equivalent weight of 530 g/mol. |
| Component (A3) | A bis-hydroxyethoxypropyl dimethicone having a capillary viscosity at 25° C. of 50 cSt and an OH equivalent weight of 569 g/mol. |
| Component (B1) | A 4.9 functional, sucrose/glycerine initiated polyether polyol with an OH equivalent weight of 156 g/mol, and an average kinematic viscosity at 38° C. of 850-1,200 cSt as measured in accordance with ASTM D4878. |
| Component (B2) | A propoxylated glycerine (polyether triol) with an OH equivalent weight of 360 g/mol, and an average kinematic viscosity @ 25° C. of 200 to 300 cSt as measured in accordance with ASTM D445. |
| Component (B3) | A propoxylated glycerine (polyether triol) with an OH equivalent weight of 85 g/mol, and an average kinematic viscosity at 38° C. of 298 cSt as measured in accordance with ASTM D445. |
| Component (B4) | A 7.0 functional, sucrose/glycerine initiated polyether polyol with OH equivalent weight of 152 g/mol, and an average kinematic viscosity at 25° C. of 30,580 cSt as measured in accordance with ASTM D445. |
| Component (B5) | A propoxylated glycerine (polyether diol) with an OH equivalent weight of 2000 g/mol, and an average kinematic viscosity at 25° C. of 920 cSt as measured in accordance with ASTM D4878. |
| Component (B6) | A propoxylated and ethoxylated glycerine (polyether triol) with an OH equivalent weight of 1040 g/mol, and an average kinematic viscosity at 25° C. of 600 cSt as measured in accordance with ASTM D4878. |
| Component (B7) | A propoxylated polyethylene glycol (polyether diol) capped with ~16.9 wt % ethoxylation and with an OH equivalent weight of 2000 g/mol, and an average kinematic viscosity at 100° F. of 412 cSt as measured in accordance with ASTM D445. |
| Component (B8) | A propoxylated glycerine (polyether triol) capped with ~14.5 wt % ethoxylation and with an OH equivalent gweight of 2000 /mol, and an average kinematic viscosity at 25° C. of 1120 cSt as measured in accordance with ASTM D4878. |
| Component (B9) | A propoxylated glycerine (polyether triol) with an OH equivalent weight of 1000 g/mol, and an average kinematic viscosity at 25° C. of 620 cSt as measured in accordance with ASTM D4878. |
| Component (C1) | A polymeric MDI having a nominal functionality of 2.7 and an NCO content by weight of 31%. |
| Component (C2) | A polymeric MDI having a nominal functionality of 2.3 and an NCO content by weight of 32%. |
| Component (C3) | A polymeric MDI containing having a nominal functionality of 2 and an NCO content by weight of 23%. |
| Component (D) | Deionized water |
| Component (E1) | A delayed action tertiary amine based on 1,8-Diazabicyclo[5.4.0]undec-7-ene (i.e. DBU). |
| Component (E2) | A mixture of 33 wt. % triethylenediamine dissolved in 67 wt. % dipropylene glycol. |
| Component (E3) | 2,4,6-tris(dimethylaminomethyl) phenol |
| Component (E4) | A mixture of 70 wt. % bis-(2-dimethylaminoethyl)ether and 30 wt. % dipropylene glycol. |
| Component (E5) | A 1:3 mass blend of Component (E4) and Component (E2). |
| Component (E') | 2-Ethylhexoic Acid, which contributes to acidic proton blocking Components (E1)-(E5) for delayed catalysis. |

TABLE 1-continued

Components/Compounds Utilized

| Component | Description |
|---|---|
| Component (F1) | A polyether-modified silicone surfactant, with a capillary viscosity @ 25° C. of 250 to 315 cSt. |
| Component (F2) | A polyether-modified silicone surfactant, with a capillary viscosity @ 25° C. of 500 to 950 cSt. |
| Component (F3) | A polyether-modified silicone surfactant for flexible foams, with a viscosity @ 25° C. of 530 cSt. |
| Component (G) | A polymeric lactone antioxidant. |
| Component (H) | Synthetic amorphous, pyrogenic silica surface treated with polydimethylsiloxane (PDMS). |

Examples 1-15 and Comparative Examples 1-4

Examples 1-15 and Comparative Examples 1-4 are compositions utilized to prepare foamed polyurethane articles in accordance with the General Procedure described below. In particular, each of Examples 1-15 and Comparative Examples 1-4 are compositions designed to have a total composition mass of from about 12 to 15 grams. Tables 2-5 below show the relative amounts of each component from Table 1 utilized in Examples 1-15 and Comparative Examples 1-4. "Part A" in Tables 2-5 is the particular component (C) (i.e., component (C1), (C2) or (C3)) utilized in each composition of Examples 1-15 and Comparative Examples 1-4. "Part B" in Tables 2-5 include all components other than the particular component (C) in Part A. The values for the component in Part B are weight percents (wt. %) based on the total weight of Part B. The value for Part A (i.e., the particular component (C) utilized)) is based on 100 parts by weight of Part B.

General Procedure

The General Procedure is utilized to prepare foamed polyurethane articles with the compositions of Examples 1-15 and Comparative Examples 1-4, as described further below after Tables 2-5. In the General Procedure, components (A) and (B) were weighed on an analytical balance in a Max 40 Tall FlackTek cup (40 gm tall cups) to give a polyol mixture. The remaining components of Part B were mixed with the polyol mixture in a SpeedMixer™ DAC 600.1 FVZ from FlackTek Inc. (hereafter, SpeedMixer) for 1 min at 2000 rpm to give Part B. Then, Part A, i.e., the particular component (C), was combined with Part B at the wt. % and isocyanate index set forth below in Tables 2-5 to give a reaction mixture. The reaction mixture was mixed in a SpeedMixer for 5 sec at 800 rpm and then for 6 sec at 2000 rpm. The reaction mixture was immediately removed after mixing from the SpeedMixer, and the cup lid was removed under a fume hood. A polyurethane foam began to rise in the FlackTek cup after some time following removal of the cup lid. The FlackTek cup was kept in a vertical position without any disturbance and the time noted for cream time, rise time, green strength and approx. final strength etc. are recorded as soon as the reaction and foaming was initiated. These parameters and properties are described further below.

TABLE 2

Compositions of Examples 1-5

| Component | Example 1 | Example 2 | Example 3 | Example 4 | Example 5 |
|---|---|---|---|---|---|
| | Part B | | | | |
| | Wt. % of Part B | Wt. % of Part B | Wt. % of Part B | Wt. % of Part B | Wt. % of Part B |
| Component (A1) | 71.09 | 71.22 | 71.09 | — | 35 |
| Component (A2) | — | — | — | 61.93 | — |
| Component (A3) | — | — | — | — | — |
| Component (B1) | 2.89 | 28.11 | 2.89 | 30.95 | 63.69 |
| Component (B2) | 2.05 | — | 2.05 | — | — |
| Component (B3) | 21.98 | — | 21.98 | — | — |
| Component (B4) | 0.84 | — | 0.04 | — | — |
| Component (D) | 0.42 | 0.29 | 0.42 | 0.62 | 0.18 |
| Component (E1) | 0.04 | — | 0.04 | — | 0.04 |
| Component (E2) | 0.16 | 0.11 | 0.16 | 0.48 | 0.15 |
| Component (E3) | 0.05 | — | 0.05 | — | 0.05 |
| Component (E4) | 0.32 | 0.27 | 0.32 | — | 0.32 |
| Component (E5) | — | — | — | — | — |
| Component (E') | 0.01 | — | 0.01 | — | — |
| Component (F1) | 0.17 | — | 0.17 | — | 0.17 |
| Component (F2) | — | — | — | 2.08 | — |
| Component (F3) | — | — | — | 3.95 | — |
| Component (G) | — | — | — | — | — |
| Total Part B: | 100.0 | 100.0 | 100.0 | 100.0 | 100.0 |
| Part A | | | | | |
| Component (C1) | 64.63 | 42.30 | — | 56.56 | 125.1 |
| Component (C2) | — | — | 63.00 | — | — |
| Isocyanate Index (100 = 1:1 NCO:OH molar ratio) | 115 | 106 | 115 | 109 | 115 |

TABLE 3

Compositions of Examples 6-10

| Component | Example 6 | Example 7 | Example 8 | Example 9 | Example 10 |
|---|---|---|---|---|---|
| | Part B | | | | |
| | Wt. % of Part B | Wt. % of Part B | Wt. % of Part B | Wt. % of Part B | Wt. % of Part B |
| Component (A1) | 15 | 15 | 15 | 15 | 15 |
| Component (A2) | — | — | — | — | — |
| Component (A3) | — | — | — | — | — |
| Component (B1) | 83.6 | 33.57 | 33.57 | 33.57 | 13.57 |
| Component (B2) | — | — | — | — | — |
| Component (B3) | — | — | — | — | — |
| Component (B4) | — | — | — | — | — |
| Component (B5) | — | 10 | 10 | 10 | 22 |
| Component (B6) | — | — | — | — | — |
| Component (B7) | — | — | — | — | — |
| Component (B8) | — | — | — | — | — |
| Component (B9) | — | 40 | 40 | 40 | 48 |
| Component (D) | 0.08 | 0.23 | 0.23 | 0.23 | 0.18 |
| Component (E1) | 0.04 | 0.05 | 0.05 | 0.05 | 0.05 |
| Component (E2) | 0.15 | 0.19 | 0.19 | 0.19 | 0.19 |
| Component (E3) | 0.05 | 0.06 | 0.06 | 0.06 | 0.06 |
| Component (E4) | 0.32 | 0.40 | 0.40 | 0.40 | 0.40 |
| Component (E5) | — | — | — | — | — |
| Component (E') | — | — | — | — | — |
| Component (F1) | 0.17 | 0.22 | 0.22 | 0.22 | 0.22 |

TABLE 3-continued

Compositions of Examples 6-10

| Component | Example 6 | Example 7 | Example 8 | Example 9 | Example 10 |
|---|---|---|---|---|---|
| Component (F2) | — | — | — | — | — |
| Component (F3) | — | — | — | — | — |
| Component (H) | 0.51 | 0.51 | 0.51 | 0.51 | 0.51 |
| Total Part B: | 99.9 | 100.2 | 100.2 | 100.2 | 100.2 |
| Part A | | | | | |
| Component (C1) | 154.8 | 76.10 | — | — | 40.02 |
| Component (C2) | — | — | 73.85 | — | — |
| Component (C3) | — | — | — | 101.07 | — |
| Isocyanate Index (100 = 1:1 NCO:OH molar ratio) | 115 | 115 | 115 | 115 | 115 |

TABLE 4

Compositions of Examples 11-15

| Component | Example 11 | Example 12 | Example 13 | Example 14 | Example 15 |
|---|---|---|---|---|---|
| | Wt. % of Part B | Wt. % of Part B | Wt. % of Part B | Wt. % of Part B | Wt. % of Part B |
| Component (A1) | 15 | 15 | 15 | 15 | 15 |
| Component (A2) | — | — | — | — | — |
| Component (A3) | — | — | — | — | — |
| Component (B1) | 33.34 | 33.34 | 33.34 | 21.1 | 23.34 |
| Component (B2) | — | — | — | — | — |
| Component (B3) | — | — | — | — | — |
| Component (B4) | — | — | — | — | — |
| Component (B5) | 10 | — | — | — | 12 |
| Component (B6) | 40 | 40 | — | — | 48 |
| Component (B7) | — | 10 | 10 | 10 | — |
| Component (B8) | — | — | 40 | 50 | — |
| Component (B9) | — | — | — | — | — |
| Component (D) | 0.23 | 0.23 | 0.23 | 0.23 | 0.23 |
| Component (E1) | 0.05 | 0.05 | 0.05 | 0.05 | 0.05 |
| Component (E2) | 0.19 | 0.19 | 0.19 | 0.19 | 0.19 |
| Component (E3) | 0.06 | 0.06 | 0.06 | 0.06 | 0.06 |
| Component (E4) | 0.40 | 0.40 | 0.40 | 0.40 | 0.40 |
| Component (E5) | — | — | — | — | — |
| Component (E') | — | — | — | — | — |
| Component (F1) | 0.22 | 0.22 | 0.22 | 0.22 | 0.22 |
| Component (F2) | — | — | — | — | — |
| Component (F3) | — | — | — | — | — |
| Component (H) | 0.51 | 0.51 | 0.51 | 2.75 | 0.51 |
| Total Part B: | 100.0 | 100.0 | 100.0 | 100.0 | 100.0 |
| Part A | | | | | |
| Component (C1) | — | — | — | — | — |
| Component (C2) | — | — | — | — | — |
| Component (C3) | 102.3 | 107.4 | 98.28 | 69.3 | 79.74 |
| Isocyanate Index (100 = 1:1 NCO:OH molar ratio) | 115 | 115 | 115 | 115 | 115 |

TABLE 5

Compositions of Comparative Examples 1-4

| Component | Comparative Example 1 | Comparative Example 2 | Comparative Example 3 | Comparative Example 4 |
|---|---|---|---|---|
| | Part B | | | |
| | Wt. % of Part B | Wt. % of Part B | Wt. % of Part B | Wt. % of Part B |
| Component (A1) | — | — | 95.00 | — |
| Component (A2) | — | — | — | — |
| Component (A3) | — | 95.59 | — | 96.81 |
| Component (B1) | 39.45 | — | — | — |
| Component (B2) | 27.99 | — | — | — |
| Component (B3) | 16.67 | — | — | — |
| Component (B4) | 11.47 | — | — | — |
| Component (D) | 0.50 | 2.54 | 4.36 | 2.52 |
| Component (E1) | 0.44 | — | — | — |
| Component (E2) | 0.30 | — | — | — |
| Component (E3) | 0.51 | — | — | — |
| Component (E4) | 0.17 | — | — | — |
| Component (E5) | — | 1.27 | 0.17 | 0.34 |
| Component (E4) | 0.05 | — | — | — |
| Component (F1) | 2.45 | — | — | — |
| Component (F2) | — | — | — | — |
| Component (F3) | — | — | — | — |
| Component (G) | — | 0.59 | 0.47 | 0.34 |
| Total Part B: | 100 | 100 | 100 | 100 |
| Part A | | | | |
| Component (C1) | 96.08 | — | — | — |
| Component (C2) | — | 33.61 | 43.85 | 33.53 |
| Isocyanate Index (100 = 1:1 NCO:OH molar ratio) | 106 | 86 | 104 | 85 |

As introduced above, polyurethane foamed articles (i.e., cured products) were formed with the compositions of Examples 1-15 and Comparative Examples 1-4 via the General Procedure. However, cured products formed in Comparative Examples 2-4 were not further evaluated due to performance failures. In particular, in Comparative Example 2, a liquid foam collapsed prior to curing. In Comparative Example 3, a polyurethane foam was initially formed, but the polyurethane foam of Comparative Example 3 shrank overnight, which is undesirable for many end use applications. Finally, in Comparative Example 3, a liquid foam collapsed prior to curing as in Comparative Example 2.

The kinetics of the reactions in forming the polyurethane foamed articles in Examples 1-15 and Comparative Example 1 were monitored and the resulting properties of the foamed polyurethane articles were measured. Tables 6-8 below detail the kinetics and properties of the foamed polyurethane articles formed with the compositions of Examples 1-15 and Comparative Example 1. Any time ranges in Table 6-8 are based on stopwatch values in connection with two different tests. However, Example 3 was only monitored once and does not include such a range but only a single value. N/A in Tables 6-8 means not measured.

TABLE 6

Kinetics and Properties of Foamed Polyurethane Articles Formed with the Compositions of Examples 1-5 and Comparative Example 1

| Property | Example 1 | Example 2 | Example 3 | Example 4 | Example 5 | Comp. Example 1 |
|---|---|---|---|---|---|---|
| Total mass % silicone backbone content coming from Part B | 17% | 20% | 17% | 40% | 6% | 0% |
| Cream time (foam starts rising) | 35-45 sec | 35-45 sec | 38 sec | N/A | 80 sec | 65-70 sec |
| Rise time (foam height is plateaued) | 110-145 sec | 110-145 sec | 128 sec | N/A | 340 sec | 155-190 sec |
| Gel time (string upon poking) | 3-4 min | 3-4 min | 5 min | N/A | 5-6 min | 4 min |
| Tack-free time (no string) | 6-8 min | 6-8 min | 15 min | N/A | 6-8 min | 7-8 min |
| Green strength (enough modulus to handle without crushing; recovers from deformation) | 18-20 min | 18-20 min | 15 min | N/A | 20 min | 20 min |
| Full strength (Rigid) | 30-40 min | 30-40 min | 40 min | 2 hours | 60 min | 30-40 min |
| Viscosity of Part B (cP @ 25° C.) | 847 | 803 | 847 | N/A | 1175 | 1315 |
| Initial viscosity of reaction mixture without water (cP @ 25° C.) | 803 | N/A | 529 | N/A | N/A | N/A |
| Hardness (average of 3 readings) (Shore D as per ASTM D2240) | 23 | 8 | N/A | N/A | N/A | 27 |
| TGA char @ 750° C. as % of initial mass | 10% | 6% | N/A | N/A | 15.4% | 0% |
| Peak tan-delta temperature from DMA test (° C.) | 77 | 42 | N/A | N/A | 123 | 123 |
| Expansion Ratio (1× = no expansion) | 4× | 3× | 7× | 2× | 3× | 4.7× |
| Cell size observation | Small (~0.5 mm) | Small | Small | Large defects and uneven cell size distribution | Small | Small |
| Foam observation | Foamed, no shrinkage | Foamed, no shrinkage | Foamed, no shrinkage | Foamed, no shrinkage | Foamed, no shrinkage | Foamed, no shrinkage |
| Shear modulus at 25° C. (and 60° C.) (MPa) | 10.4 (1.4) | 1.96 (0.15) | 7 (0.69) | N/A | 54.7 (45.1) | 10.9 (6.9) |

TABLE 7

Kinetics and Properties of Foamed Polyurethane Articles Formed with the Compositions of Examples 6-10

| Property | Ex. 6 | Ex. 7 | Ex. 8 | Ex. 9 | Ex. 10 |
|---|---|---|---|---|---|
| P:I Ratio (wt:wt) | 0.65 | 1.32 | 1.36 | 0.99 | 2.50 |
| % SPE in foam | 6 | 9 | 9 | 7 | 11 |
| Elastic Modulus (E') at 25° C. (ASTM D638) | 200 | 44 | 66 | 100 | 5 |
| % Elongation at break (ASTM D1708 Microtensile) | ~8 | 11 | 14 | 17 | 38 |
| Total mass % silicone backbone content coming from Part B | 2 | 3 | 3 | 3 | 4 |
| Cream time (sec) (foam starts rising) | 77 | 40 | 58 | 50 | 40 |
| Rise time (sec) (foam height is plateaued) | 263 | 180 | 180 | 180 | 180 |
| Gel time (string upon poking) | N/A | N/A | N/A | N/A | N/A |
| Tack-free time (min) (no string) | 5 | 10 | 10 | 10 | 10 |
| Green strength (min) (enough modulus to handle without crushing; recovers from deformation) | 20 | N/A | N/A | N/A | N/A |
| Full strength (Rigid) (min) | 60 | 45 | 45 | 45 | 45 |
| Viscosity of Part B (cP @ 25° C.) | 1288 | <1200 | <1200 | <1200 | <1000 |
| Initial viscosity of reaction mixture without water (cP @ 25° C.) | N/A | N/A | N/A | N/A | N/A |
| Hardness (average of 3 readings) (Shore D as per ASTM D2240) | N/A | N/A | N/A | N/A | N/A |
| TGA char @ 750° C. as % of initial mass (%) | 10.8 | 2.74 | 11.3 | 3 | 0.48 |
| Peak tan-delta temperature from DMA test (° C.) | 152 | 129 | 107 | 108 | N/A |
| Expansion Ratio (1× = no expansion) | 3× | 2.4 | 2.2 | 2.2 | 2.3 |
| Cell size observation | Small | Small | Small | Small | Small |
| Foam observation | Foamed, no shrinkage | Foamed, no shrinkage | Foamed, no shrinkage | Foamed, no shrinkage | Foamed, no shrinkage |
| Shear modulus at 25° C. (and 60° C.) (MPa) | 94 (82) | 17 (11) | 37 (23) | 39 (24) | N/A |

TABLE 8

Kinetics and Properties of Foamed Polyurethane Articles Formed with the Compositions of Examples 11-15

| Property | Ex. 11 | Ex. 12 | Ex. 13 | Ex. 14 | Ex. 15 |
|---|---|---|---|---|---|
| P:I Ratio (wt:wt) | 0.98 | 0.93 | 1.02 | 1.44 | 1.25 |
| % SPE in foam | 7 | 7 | 8 | 9 | 8 |
| Elastic Modulus (E') at 25 C. (ASTM D638) | 159 | 92 | 64 | 89 | 1.5 |
| % Elongation at break (ASTM D1708 Microtensile) | 12 | 15 | 18 | 40 | 98 |
| Total mass % silicone backbone content coming from Part B | 3 | 3 | 3 | 4 | 3 |
| Cream time (sec) (foam starts rising) | N/A | N/A | N/A | 65 | 55 |
| Rise time (sec) (foam height is plateaued) | N/A | N/A | N/A | 180 | 210 |
| Gel time (string upon poking) | N/A | N/A | N/A | 7 | 10 |
| Tack-free time (min) (no string) | N/A | N/A | N/A | N/A | N/A |
| Green strength (min) (enough modulus to handle without crushing; recovers from deformation) | N/A | N/A | N/A | 30 | N/A |
| Full strength (Rigid) (min) | N/A | N/A | N/A | 60 | N/A |

TABLE 8-continued

Kinetics and Properties of Foamed Polyurethane Articles Formed with the Compositions of Examples 11-15

| Property | Ex. 11 | Ex. 12 | Ex. 13 | Ex. 14 | Ex. 15 |
|---|---|---|---|---|---|
| Viscosity of Part B (cP @ 25° C.) | N/A | N/A | N/A | 2800 | N/A |
| Initial viscosity of reaction mixture without water (cP @ 25° C.) | N/A | N/A | N/A | 2539 | N/A |
| Hardness (average of 3 readings) (Shore D as per ASTM D2240) | N/A | N/A | N/A | N/A | N/A |
| TGA char @ 750° C. as % of initial mass (%) | 7.2 | 7.3 | 6.6 | 2.5 | 0.7 |
| Peak tan-delta temperature from DMA test (° C.) | N/A | N/A | N/A | N/A | N/A |
| Expansion Ratio (1× = no expansion) | ~2.5 | ~2.5 | ~2.5 | 2.1 | ~2.5 |
| Cell size observation | Small | Small | Small | Small | Small |
| Foam observation | Foamed, no shrinkage | Foamed, no shrinkage | Foamed, no shrinkage | Foamed, no shrinkage | Foamed, no shrinkage |
| Shear modulus at 25° C. (and 60° C.) (MPa) | N/A | N/A | N/A | N/A | N/A |

It is to be understood that the appended claims are not limited to express and particular compounds, compositions, or methods described in the detailed description, which may vary between particular embodiments which fall within the scope of the appended claims.

What is claimed is:

1. A composition for preparing a foamed polyurethane article, said composition comprising:
    (1) an isocyanate-reactive component, the isocyanate-reactive component, comprising:
       (A) an organopolysiloxane having an average of at least two carbinol functional groups per molecule; and
       (B) a polyol;
       wherein the (A) organopolysiloxane is present in the isocyanate-reactive component in an amount of from >10 to <99 wt. % based on the combined weight of the (A) organopolysiloxane and the (B) polyol; and
       wherein the (A) organopolysiloxane includes up to 5 mol % T and/or Q siloxy units based on all siloxy units present in the (A) organopolysiloxane;
    (2) an isocyanate component comprising (C) a polyisocyanate;
    (D) a blowing agent; and
    (E) a catalyst.

2. The composition of claim 1, wherein: (i) the carbinol functional groups are the same as one another; (ii) the carbinol functional groups have the general formula -D-O$_a$—(C$_b$H$_{2b}$O)$_c$—H, where D is a covalent bond or a divalent hydrocarbon linking group having from 2 to 18 carbon atoms, subscript a is 0 or 1, subscript b is independently selected from 2 to 4 in each moiety indicated by subscript c, and subscript c is from 0 to 500, with the proviso that subscripts a and c are not simultaneously 0; or (iii) both (i) and (ii).

3. The composition of claim 2, wherein, in at least one of the carbinol functional groups: (i) subscript D is a divalent hydrocarbon linking group having from 2 to 18 carbon atoms, subscript a is 1, and subscript c is 0 such that the carbinol functional group has the general formula -D-OH; (ii) the carbinol functional groups are terminal; or (iii) both (i) and (ii).

4. The composition of claim 1, wherein: (i) at least one of the carbinol functional groups has the general formula:

where D is a covalent bond or a divalent hydrocarbon linking group having from 2 to 18 carbon atoms, subscript a is 0 or 1, 0≤x≤500, 0≤y≤500, and 0≤z≤500, with the proviso that 1≤x+y+z≤500; (ii) the carbinol functional groups are pendent; or (iii) both (i) and (ii).

5. The composition of claim 1, wherein: (i) component (A) has an OH equivalent weight of from 400 to 1,200 g/mol; (ii) component (A) has a viscosity at 25° C. of from 1 to 1,000 mPa·s; (iii) component (A) is substantially linear; (iv) at least one of the carbinol functional groups is pendent; (v) at least one of the carbinol functional groups is terminal; (vi) component (A) is present in the composition in an amount of from 15 to 80 wt. % based on the total weight of the composition; (vii) component (A) has the general formula:

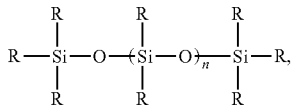

where each R is an independently selected hydrocarbyl group or comprises a carbinol functional group, with the proviso that at least two of R independently comprise a carbinol functional group, and subscript n is from 0 to 100; of (viii) any combination of (i) to (vii).

6. The composition of claim 1, wherein component (B): (i) has a number-average functionality of from 2 to 8; (ii) has an average OH equivalent weight of from greater than 0 to 2,000; (iii) is a polyether polyol; or (iv) any combination of (i) to (iii).

7. The composition of claim 1, wherein: (i) component (C) comprises polymeric MDI (pMDI); (ii) the isocyanate-reactive component has a viscosity at 25° C. of less than 1,000 mPa·s; or (iii) both (i) and (ii).

8. A foamed polyurethane article comprising the reaction product of the composition of claim 1.

9. The foamed polyurethane article of claim 8, having: (i) a closed-cell structure; (ii) a glass transition temperature (T$_g$) of greater than 20° C.; (iii) a density of from 0.1 to 0.6 g/cm$^3$; or (iv) any combination of (i) to (iii).

10. The foamed polyurethane article of claim 8, further defined as an encapsulant, a pottant, a thermal barrier, and/or an article suitable for automotive applications.

11. A method of preparing a composite article, said method comprising:
- disposing a composition on a substrate, and
- curing the composition to give a foamed polyurethane article on the substrate and prepare the composite article,
- wherein the composition is the composition of claim 1.

12. The method of claim 11, wherein the substrate defines at least one gap and disposing the composition comprises disposing the composition in the at least one gap such that the foamed polyurethane article is present within the gap in the composite article.

13. The method of claim 12, wherein the substrate comprises a battery cell and the composite article comprises a battery pack.

14. The composite article formed in accordance with the method of claim 11.

* * * * *